United States Patent
Abiko et al.

(10) Patent No.: US 8,472,679 B2
(45) Date of Patent: Jun. 25, 2013

(54) BIOMETRIC INFORMATION PROCESSING APPARATUS, BIOMETRIC INFORMATION PROCESSING METHOD, AND BIOMETRIC INFORMATION PROCESSING COMPUTER PROGRAM

(75) Inventors: Yukihiro Abiko, Kawasaki (JP); Narishige Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/440,522

(22) Filed: Apr. 5, 2012

(65) Prior Publication Data
US 2012/0189171 A1    Jul. 26, 2012

Related U.S. Application Data

(63) Continuation of application No. PCT/JP2009/068390, filed on Oct. 27, 2009.

(51) Int. Cl.
*G06K 9/00*    (2006.01)

(52) U.S. Cl.
USPC ........... 382/115; 382/116; 382/119; 382/123; 382/125; 382/126

(58) Field of Classification Search
USPC .............. 382/100, 115, 116, 119, 123, 124, 382/125, 126, 127; 235/375, 380; 340/5.1, 340/5.2, 5.21, 5.52, 5.82
See application file for complete search history.

(56) References Cited

U.S. PATENT DOCUMENTS

| | | | | |
|---|---|---|---|---|
| 6,002,785 A | * | 12/1999 | Ucida | 382/124 |
| 2005/0226467 A1 | | 10/2005 | Hatano et al. | |
| 2006/0056700 A1 | | 3/2006 | Abiko et al. | |
| 2007/0297653 A1 | * | 12/2007 | Bolle et al. | 382/124 |
| 2008/0232654 A1 | * | 9/2008 | Bolle et al. | 382/124 |
| 2009/0022374 A1 | * | 1/2009 | Boult | 382/119 |
| 2009/0245596 A1 | * | 10/2009 | Niinuma | 382/124 |

FOREIGN PATENT DOCUMENTS

| | | |
|---|---|---|
| JP | 8-129644 | 5/1996 |
| JP | 2002-208001 | 7/2002 |
| JP | 2002-298126 | 10/2002 |
| JP | 2004-86463 | 3/2004 |
| WO | 2004/079658 A1 | 9/2004 |
| WO | 2004/102481 A1 | 11/2004 |

OTHER PUBLICATIONS

International Search Report of PCT/JP2009/068390 mailed Nov. 24, 2009.

* cited by examiner

*Primary Examiner* — Ali Bayat

(74) *Attorney, Agent, or Firm* — Staas & Halsey LLP

(57) ABSTRACT

A biometric information processing apparatus includes: a biometric information acquiring unit which acquires a user's biometric information and generates a biometric input image representing the biometric information; and a processing unit. The processing unit implements: generating a first intermediate image by applying first image processing to the biometric input image; generating a second intermediate image by applying second image processing to the biometric input image; detecting, from each of the first and second intermediate images, a singular point candidate; calculating a distance between the singular point candidates detected from each of the first and second intermediate images for the same singular point contained in the biometric information; calculating a quality metric for the biometric input image based on the distance; and if the quality metric is not higher than a predefined threshold value, then prompting the user to have the user's biometric information reacquired by the biometric information acquiring unit.

11 Claims, 10 Drawing Sheets

BIOMETRIC INFORMATION PROCESSING APPARATUS, BIOMETRIC INFORMATION PROCESSING METHOD, AND BIOMETRIC INFORMATION PROCESSING COMPUTER PROGRAM

CROSS-REFERENCE TO RELATED APPLICATION

This application is a continuation application and is based upon PCT/JP2009/68390, filed on Oct. 27, 2009, the entire contents of which are incorporated herein by reference.

FIELD

The embodiments disclosed herein are related to a biometric information processing apparatus, a biometric information processing method and a biometric information processing computer program which utilizes biometric information presented in the form of a biometric image for biometric authentication.

BACKGROUND

Recent years have seen the development of biometric authentication technology for authenticating a user of an apparatus or system based on a biometric image representing the user's biometric information such as a palm or finger vein pattern or a fingerprint or palm print. A biometric authentication device using such biometric authentication technology acquires, as a biometric input image, a biometric image representing, for example, the biometric information of the user who wishes to use the biometric authentication device. Then, the biometric authentication device compares the user's biometric input information represented by the biometric input image with registered biometric information, i.e., biometric information prestored in a biometric image for each registered user. If the result of the comparison indicates that the biometric input information matches the registered biometric information, the biometric authentication device authenticates the user as being a legitimate registered user. The biometric authentication device then permits the authenticated user to use the apparatus in which the biometric authentication device is incorporated or some other apparatus connected to the biometric authentication device.

A general problem with the biometric authentication is that the biometric information represented by the registered biometric image does not always match the biometric information represented by the biometric input image even when the biometric information is one acquired of the same person. Possible causes are that the person's body part carrying the biometric information is differently positioned on the sensor at the time of matching than at the time of registration, or the condition of the body part carrying the biometric information is different. If the condition of the body part is different at the time of matching than at the time of registration, the feature quantity extracted from the biometric image acquired at the time of matching, for example, may differ from the feature quantity extracted from the biometric image acquired at the time of registration.

For example, when using a fingerprint as the biometric information, the degree of skin roughness or dryness of the finger surface or the degree of wetness of the finger surface due to moisture such as sweat, water, or hand cream may be different at the time of matching than at the time of registration. In certain instances, a portion of the fingerprint image acquired at the time of matching may be blurred, and the feature quantity extracted from such a fingerprint image may differ from the feature quantity extracted from the fingerprint acquired at the time of registration.

In this case, since the feature quantities extracted from the respective images do not perfect match, the accuracy of matching may degrade.

In view of the above situation, techniques have been developed that judge whether the biometric information represented by the acquired biometric image satisfies a given quality level (for example, refer to Japanese Laid-open Patent Publication No. 2002-298126, Japanese Laid-open Patent Publication No. 2002-208001, Japanese Laid-open Patent Publication No. 2004-86463, and International Publication Pamphlet No. WO2004-102481).

One such prior art discloses an apparatus that determines whether or not the acquired fingerprint image is suitable for use for authentication, by first checking whether a fingerprint formed from ridges and valleys exists in each of the regions into which the fingerprint input image has been segmented and then judging the condition of the skin surface in each segment region. The degree of connectivity of light/dark pixels and the ratio of light/dark pixels are used to determine the presence or absence of a fingerprint and judge the condition of the skin surface, respectively.

Another prior art discloses a fingerprint matching apparatus which calculates the degree of lightness from image data acquired by a fingerprint sensor and, based on the calculated degree of lightness, judges the quality of the image represented by the image data.

Still another prior art discloses a fingerprint matching apparatus which, from fingerprint image data acquired of a subject, generates edge extraction image data that enhances the ridges of the acquired fingerprint or gradation direction extraction image data that indicates the direction of gradation change on a pixel-by-pixel basis. The fingerprint matching apparatus then determines whether or not to register the image data, based on the amount of displacement between the centroid of the edge image and the center of the image or on the total number for each direction pattern that is computed from the gradation change direction pattern for each sub-region of the gradation direction extraction image data.

Yet another prior art discloses a biometric information detection apparatus that judges the condition of an acquired image based on the average value and standard deviation of the pixel values taken over a biometric information region defined on the acquired image.

SUMMARY

The biometric authentication device measures the quality of the biometric information represented by the biometric image and, if the quality is poor, then re-generates the biometric image by rereading the biometric information, thereby preventing the authentication accuracy from degrading.

Even when a portion of the biometric image is blurred, if the features useful for matching are not contained in the blurred region, the biometric authentication device could accurately match the biometric input information against the registered biometric information by using the biometric image. However, in the prior art biometric authentication device, it has been the practice to determine whether the image representing the biometric information is suitable for matching or not, based on the same criteria without regard to the features useful for matching. As a result, the biometric authentication device employing the prior art technique may determine that the image is unsuitable to use for matching, even when information needed to accurately perform the matching is contained in the biometric image. In such cases, the user is requested to reenter the biometric information when there is otherwise no need to have the biometric information reread and, as a result, the time taken to complete the biometric authentication process may become needlessly long.

According to one embodiment, a biometric information processing apparatus is provided. The biometric information processing apparatus includes: a biometric information acquiring unit which acquires a user's biometric information and generates a biometric input image representing the biometric information; and a processing unit. The processing unit implements: a first intermediate image generating function which generates a first intermediate image by applying first image processing to the biometric input image; a second intermediate image generating function which generates a second intermediate image by applying second image processing to the biometric input image, the second image processing being different from the first image processing; a singular point candidate detecting function which detects, from each of the first and second intermediate images, a singular point candidate that is a point corresponding to a singular point characterizing biometric input information acquired as the user's biometric information represented by the biometric input image; a singular point candidate distance calculating function which calculates a distance between the singular point candidate detected from the first intermediate image and the singular point candidate detected from the second intermediate image for the same singular point contained in the biometric input information; a quality judging function which calculates a quality metric for the biometric input image in such a manner as to set the quality metric higher as the distance between the singular point candidates decreases, and which judges whether or not the quality metric is higher than a predefined threshold value; and a guidance function which, if the quality metric is not higher than the threshold value, prompts the user to have the user's biometric information reacquired by the biometric information acquiring unit.

According to another embodiment, a biometric information processing method is provided. The biometric information processing method includes: acquiring a user's biometric information and generating a biometric input image representing the biometric information; generating a first intermediate image by applying first image processing to the biometric input image; generating a second intermediate image by applying second image processing to the biometric input image, the second image processing being different from the first image processing; detecting, from each of the first and second intermediate images, a singular point candidate that is a point corresponding to a singular point characterizing biometric input information acquired as the user's biometric information represented by the biometric input image; calculating a distance between the singular point candidate detected from the first intermediate image and the singular point candidate detected from the second intermediate image for the same singular point contained in the biometric input information; calculating a quality metric for the biometric input image in such a manner as to set the quality metric higher as the distance between the singular point candidates decreases, and judging whether or not the quality metric is higher than a predefined threshold value; and if the quality metric is not higher than the threshold value, then prompting the user to have the user's biometric information reacquired by the biometric information acquiring unit.

According to still another embodiment, a computer program for causing a computer to perform biometric information processing is provided. The computer program includes instructions for causing the computer to execute: generating a first intermediate image by applying first image processing to a biometric input image generated by a biometric information acquiring unit as an image representing a user's biometric information; generating a second intermediate image by applying second image processing to the biometric input image, the second image processing being different from the first image processing; detecting, from each of the first and second intermediate images, a singular point candidate that is a point corresponding to a singular point characterizing biometric input information acquired as the user's biometric information represented by the biometric input image; calculating a distance between the singular point candidate detected from the first intermediate image and the singular point candidate detected from the second intermediate image for the same singular point contained in the biometric input information; calculating a quality metric for the biometric input image in such a manner as to set the quality metric higher as the distance between the singular point candidates decreases, and judging whether or not the quality metric is higher than a predefined threshold value; and if the quality metric is not higher than the threshold value, then prompting the user to have the user's biometric information reacquired by the biometric information acquiring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A biometric information processing apparatus which carries out a biometric authentication process according to a first embodiment will be described below with reference to the drawings.

The biometric information processing apparatus, which performs biometric authentication to authenticate a user, acquires a biometric input image as an image representing the user's biometric information. The biometric information processing apparatus performs two different kinds of image processing on the biometric input image, and extracts singular points characterizing the user's biometric information from the two kinds of intermediate images obtained by the image processing. Then, the biometric information processing apparatus judges the quality of the biometric input image by the degree of matching between the singular points extracted from the two kinds of intermediate images.

In the present embodiment, the biometric information processing apparatus uses a fingerprint as the biometric information for biometric authentication. However, other kinds of biometric information, such as a palm print, nose print, vein pattern, palm geometry, face, auricle, retinal pattern, etc., that can be presented in the form of a still image, may be used as the biometric information for biometric authentication.

In this specification, the term "matching process" is used to refer to the process for computing the degree of similarity between the biometric input information and the registered biometric information. Further, the term "biometric authentication process" is used to refer to the entire authentication process which includes not only the matching process but also the process for determining whether the user is an authenticated user or not based on the degree of similarity obtained by the matching process.

Figure 1:
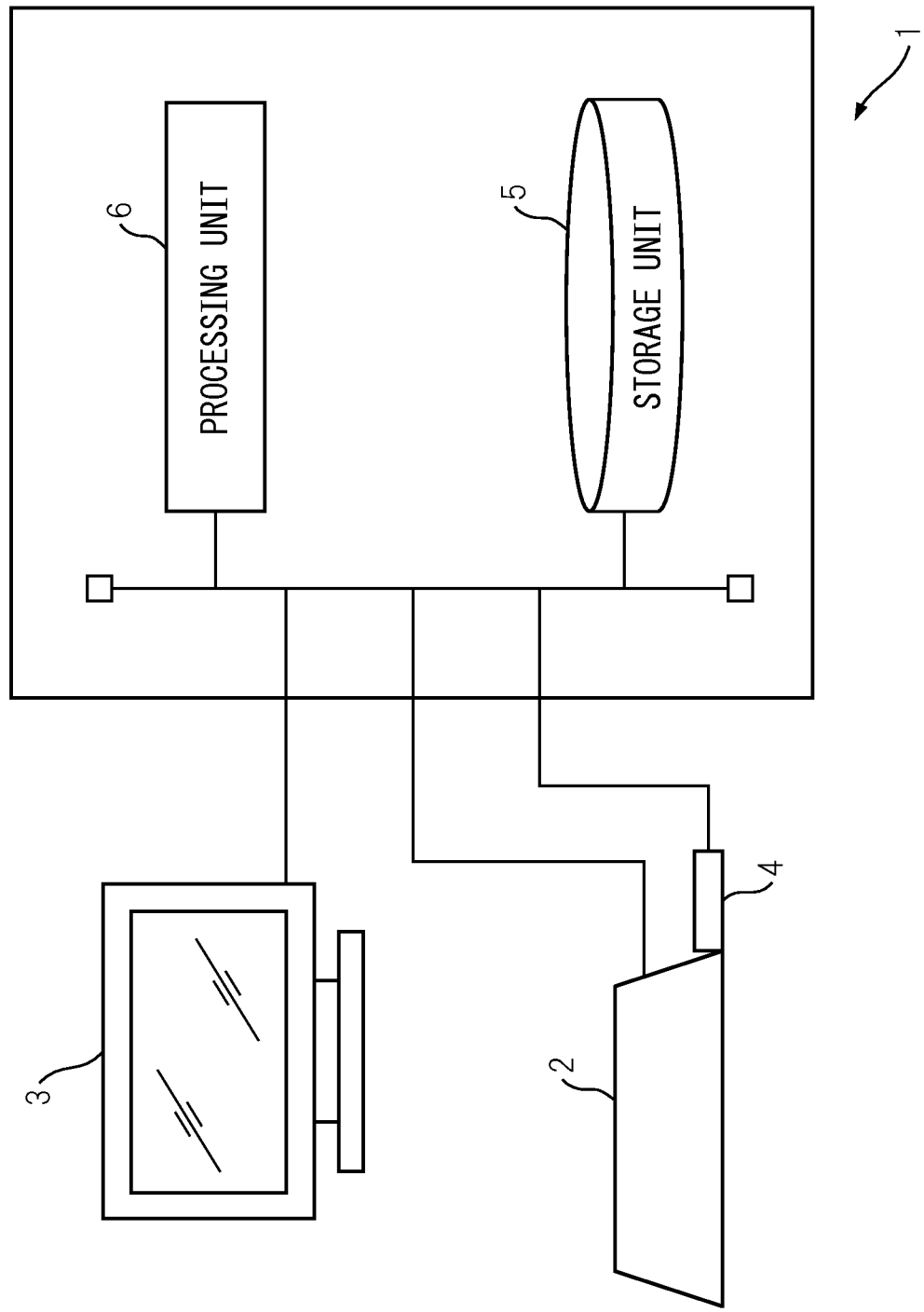
FIG. 1 is a diagram schematically illustrating the configuration of a biometric information processing apparatus according to a first embodiment.

FIG. 1 is a diagram schematically illustrating the configuration of the biometric information processing apparatus. As illustrated in FIG. 1, the biometric information processing apparatus 1 includes a display unit 2, a biometric information acquiring unit 3, an input unit 4, a storage unit 5, and a processing unit 6. The biometric information processing apparatus 1 generates by means of the biometric information acquiring unit 3 a biometric input image representing the user's fingerprint, and carries out the biometric authentication process by using the biometric input image. When the user is authenticated as being one of the registered users as a result of the biometric authentication, the biometric information processing apparatus 1 permits the user to use the apparatus equipped with the biometric information processing apparatus 1. Alternatively, the biometric information processing apparatus 1 transmits to another apparatus (not depicted) a signal indicating that the user has been authenticated, and permits the user to use that other apparatus.

The display unit 2 includes a display device such as a liquid crystal display or a CRT monitor. The display unit 2 displays a guidance message for directing the user to place his/her finger properly on the position where the biometric information acquiring unit 3 can correctly acquire the biometric input image. The display unit 2 also displays various kinds of information associated with applications executed by the processing unit 6.

The biometric information acquiring unit 3 generates the biometric input image representing the user's fingerprint. For this purpose, the biometric information acquiring unit 3 includes, for example, a sweep-type fingerprint sensor. This fingerprint sensor may be a sensor that employs, for example, an optical type, a capacitive type, an electric field type, or a heat-sensitive type sensing element. Alternatively, the biometric information acquiring unit 3 may include a fingerprint sensor of any suitable type that uses an area sensor. The biometric information acquiring unit 3 passes the generated biometric input image to the processing unit 6.

The biometric information acquiring unit 3 may be formed integrally with the display unit 2 or the input unit 4.

The input unit 4 includes a user interface, such as a keyboard, a mouse, or a touchpad. A command, data, or user identification information that the user entered via the input unit 4 is passed to the processing unit 6. If the user does not need to enter any information other than his biometric information into the biometric information processing apparatus 1, the input unit 4 may be omitted.

The storage unit 5 includes at least one device selected, for example, from among a semiconductor memory device, a magnetic disk device, and an optical disk device. The storage unit 5 stores an application program to be used in the biometric information processing apparatus 1, the identification information and personal setting information of at least one registered user, and various kinds of data. The storage unit 5 further stores a program for carrying out the biometric authentication process. Furthermore, for each registered user, the storage unit 5 stores data concerning the fingerprint of the user's designated finger as the registered biometric information of the registered user. The data concerning the registered biometric information may be, for example, a registered biometric image acquired by capturing an image of the fingerprint of the registered user's designated finger. Alternatively, the data concerning the registered biometric information may be a feature quantity extracted for matching purposes from the registered biometric image itself or from a sub-region thereof.

The storage unit 5 also stores the guidance message for prompting the user to place his finger properly on the position where the biometric information acquiring unit 3 can correctly acquire the biometric input image.

The processing unit 6 includes one or a plurality of processors and their peripheral circuitry. The processing unit 6 acquires the biometric input image as the biometric input information representing the user's fingerprint from the biometric information acquiring unit 3, and carries out the biometric authentication process by using the acquired biometric input image.

Figure 2:
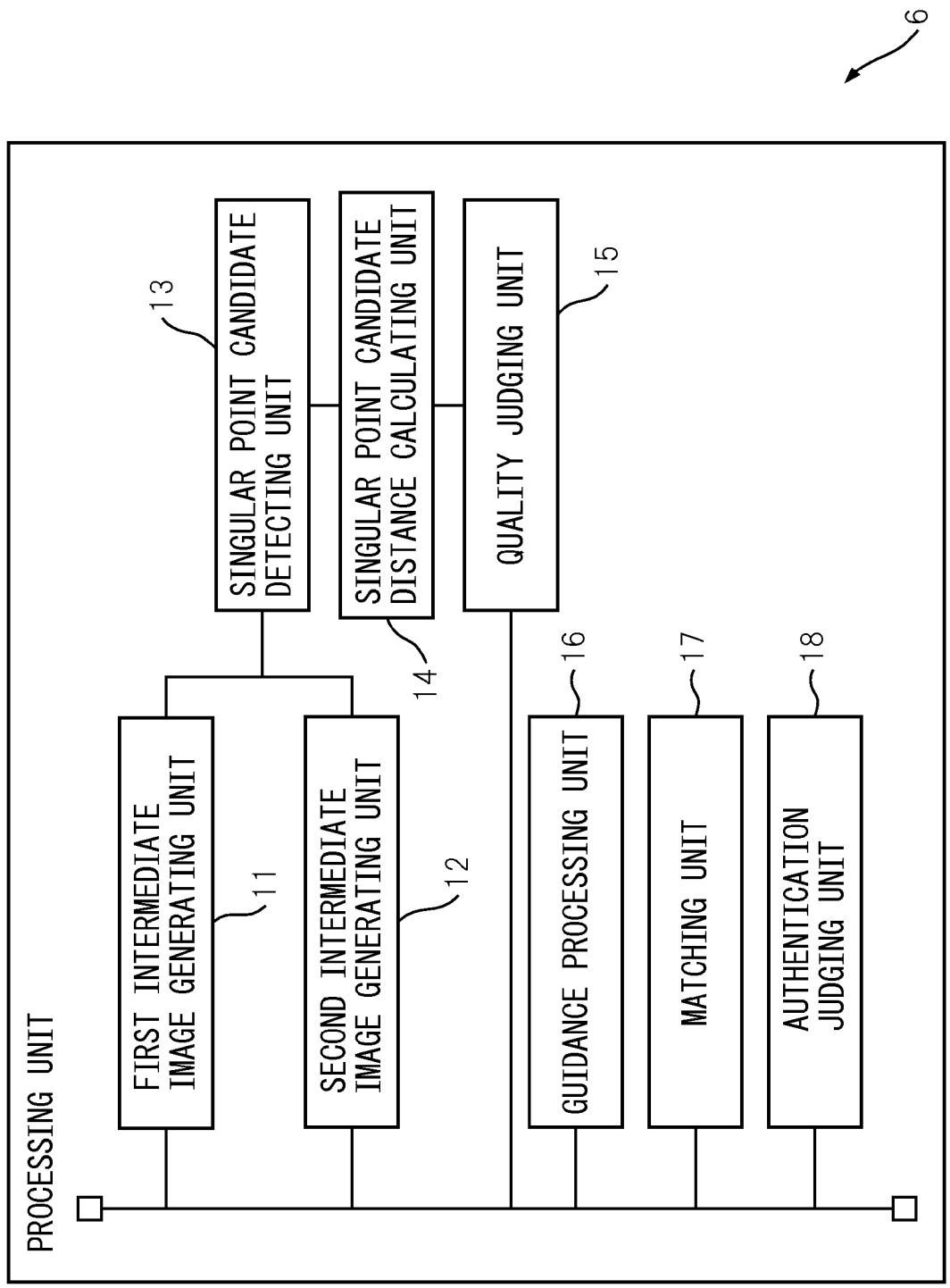
FIG. 2 is a functional block diagram of a processing unit incorporated in the biometric information processing apparatus according to the first embodiment, illustrating the functions to be implemented when performing a biometric authentication process to authenticate a user.

FIG. 2 is a functional block diagram of the processing unit 6, illustrating the functions to be implemented in order to carry out the biometric authentication process. As illustrated in FIG. 2, the processing unit 6 includes a first intermediate image generating unit 11, a second intermediate image generating unit 12, a singular point candidate detecting unit 13, a singular point candidate distance calculating unit 14, a quality judging unit 15, a guidance processing unit 16, a matching unit 17, and an authentication judging unit 18. These units included in the processing unit 6 are functional modules implemented by executing a computer program on the processor incorporated in the processing unit 6. Alternatively, these units included in the processing unit 6 may be implemented as firmware on the biometric information processing apparatus 1.

The first intermediate image generating unit 11 generates a first intermediate image by applying image processing to the biometric input image for correcting any blurred region contained in the biometric input image. Such image processing includes, for example, contrast correction or frequency enhancement.

For contrast correction, the first intermediate image generating unit 11 converts the biometric input image to grayscale so that the maximum and minimum values of the pixels contained in the biometric region representing the biometric input information in the biometric input image are respectively defined by prescribed values (for example, the maximum value is 255, and the minimum value is 0). The first intermediate image generating unit 11 takes the converted biometric input image as the first intermediate image. The above biometric region can be detected, for example, by binarizing the entire biometric input image using a given threshold value. For example, the pixel values in the background region where the image of the finger is not captured in the biometric input image are generally very low or very high. Therefore, the distribution of the pixel values in the background region is different from the distribution of the pixel values in the biometric region. In view of this, the first intermediate image generating unit 11 can determine the given threshold value by performing discriminant analysis on the histogram of the pixel values taken over the entire biometric input image.

For frequency enhancement, on the other hand, the first intermediate image generating unit 11 applies, for example, a fast Fourier transform to the biometric input image. The first intermediate image generating unit 11 enhances the frequency component corresponding to the ridge spacing in the frequency image obtained as a result of the fast Fourier transform. Then, by applying an inverse fast Fourier transform to the frequency enhanced frequency image, the first intermediate image generating unit 11 generates the first intermediate image. The first intermediate image generating unit 11 may use a wavelet transform instead of the fast Fourier transform. Further, the first intermediate image generating unit 11 may generate the first intermediate image by applying both the contrast correction and the frequency enhancement to the biometric input image.

The first intermediate image generating unit 11 passes the first intermediate image to the singular point candidate detecting unit 13.

The second intermediate image generating unit 12 generates a second intermediate image by applying image processing to the biometric input image for eliminating noise from the biometric input image. Such image processing includes, for example, masking that uses a Gaussian filter or a median filter or the like. Alternatively, the second intermediate image generating unit 12 may perform a morphological opening closing operation on the biometric input image. Further, the second intermediate image generating unit 12 may take the biometric input image itself as the second intermediate image.

The second intermediate image generating unit 12 passes the second intermediate image to the singular point candidate detecting unit 13.

Preferably, the processing performed by each of the first and second intermediate image generating units 11 and 12 is one that does not alter the relative positional relationships among the ridge endings or bifurcations contained in the biometric input information or among the singular points to be described later.

The singular point candidate detecting unit 13 detects, from each of the first and second intermediate images, a point corresponding to a singular point characterizing the biometric input information. If such singular points can be detected accurately, the biometric input image can be considered to contain the characteristic features of the user's biometric input image. Therefore, the quality of the biometric input image can be considered good enough to be used for matching.

In the present embodiment, the biometric input information is a fingerprint. Typical examples of the singular points characterizing the fingerprint will be described below.

Figure 3:
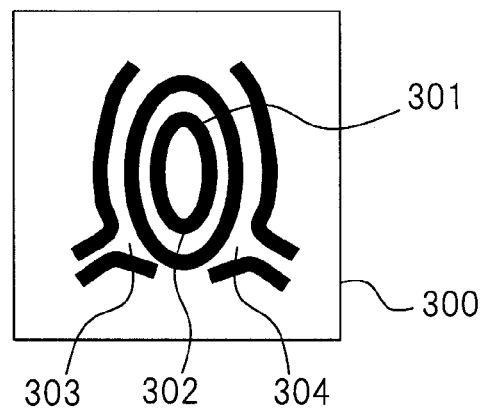
FIG. 3 is a diagram illustrating examples of singular points detected on a fingerprint.

FIG. 3 is a diagram illustrating examples of the singular points detected on a fingerprint. In the fingerprint image 300 presented in FIG. 3, solid black lines indicate the ridges, and unfilled portions indicate the valleys. The upper edge of the fingerprint image 300 corresponds to the tip of the finger. Since each ridge is formed in the form of a whorl on the fingerprint, the center of the whorl provides a singular point. For example, the center of the whorl, 301, of an upward convex ridge is referred to as an upward convex core. The center of the whorl, 302, of a downward convex ridge may also be detected, depending on the type of fingerprint. The center of the whorl, 302, of such a downward convex ridge is referred to as a downward convex core. Further, depending on the type of fingerprint, ridges are formed in the shape of a delta. Usually, the number of such points 303 and 304 that can exist on one fingerprint is two or less. The points 303 and 304 where ridges are formed in the shape of a delta are each termed a delta singular point.

The singular point candidate detecting unit 13 therefore detects the points corresponding to the upward convex core, the downward convex core, and the delta singular point, respectively, as singular point candidates.

The singular point candidate detecting unit 13 calculates, for example, the Poincare index of each pixel from each intermediate image, and detects any pixel whose Poincare index satisfies a prescribed condition as a candidate for the upward convex core, the downward convex core, or the delta singular point. Methods for detecting singular points using the Poincare index are disclosed, for example, by D. Maltoni et al., in "Handbook of Fingerprint Recognition," Springer Science, p. 100, or by Kawagoe et al., in "Fingerprint Pattern Classification," Pattern Recognition, 1984, Vol. 17, No. 3, pp. 295-303.

The singular point candidate detecting unit 13 may detect the singular point candidates in accordance with the following procedure.

First, by binarizing each intermediate image using a method of local thresholding, the singular point candidate detecting unit 13 creates a binarized intermediate image in which the pixels corresponding to the ridges and the pixels corresponding to the valleys have respectively different values. Next, the singular point candidate detecting unit 13 applies thinning to the binarized intermediate image so that each ridge is represented by one pixel width. After that, the singular point candidate detecting unit 13 obtains a correlation value by performing template matching between at least one template corresponding to the upward convex core and the thinned binarized intermediate image. More specifically, the singular point candidate detecting unit 13 performs the template matching while varying the position of the template relative to the thinned binarized intermediate image, and obtains the correlation value between them at each position on the thinned binarized intermediate image. If the correlation value obtained on the thinned binarized intermediate image is equal to or larger than a predetermined value (for example, 0.9), the singular point candidate detecting unit 13 determines that a candidate for the upward convex core is located at the position corresponding to that correlation value.

In like manner, the singular point candidate detecting unit 13 extracts candidates for the downward convex core and the delta singular point from each intermediate image by performing template matching between the thinned binarized intermediate image and the template corresponding to the downward convex core or the delta singular point, respectively.

If the maximum value of the correlation computed between the thinned binarized intermediate image and the template corresponding to the upward convex core is smaller than the predetermined value, the singular point candidate detecting unit 13 does not detect any candidate for the upward convex core. Likewise, if the maximum value of the correlation computed between the thinned binarized intermediate image and the template corresponding to the downward convex core or the delta singular point is smaller than the predetermined value, the singular point candidate detecting unit 13 does not detect any candidate for the downward convex core or the delta singular point.

Each template, for example, has a size just large enough to contain a plurality of ridges. The template corresponding to the upward convex core carries a binary pattern corresponding to the upward convex core, for example, a plurality of substantially concentric arcs convex upward. Similarly, the template corresponding to the downward convex core carries a binary pattern corresponding to the downward convex core, for example, a plurality of substantially concentric arcs convex downward. On the other hand, the template corresponding to the delta singular point carries a pattern in which ridges extend in three directions from one pixel.

When the candidate for the upward convex core is detected, the singular point candidate detecting unit 13 may obtain the directions of a plurality of ridges contained in a region that is located downward of the upward convex core in the vicinity of the position where the upward convex core was detected on the thinned binarized intermediate image. Such a region, for example, has a horizontal width containing a plurality of ridges with the detected position of the upward convex core as the center of the horizontal direction and a vertical width containing a plurality of ridges with the detected position of the upward convex core as the upper edge thereof. The singular point candidate detecting unit 13 determines the direction of the ridges forming the upward convex core by taking the average of the directions of the plurality of ridges contained in that region. Similarly, when the candidate for the downward convex core is detected, the singular point candidate detecting unit 13 may obtain the directions of a plurality of ridges contained in a region that is located upward of the downward convex core in the vicinity of the position where the downward convex core was detected. Further, the singular point candidate detecting unit 13 may obtain the directions of the ridges merging into the delta singular points from three directions.

The singular point candidate detecting unit 13 may extract the candidates for the singular points, such as the upward convex core, the downward convex core, and the delta singular point, from each intermediate image by using other known methods for detecting such singular points. Further, the singular point candidate detecting unit 13 may obtain the directions of ridges in the vicinity of each singular point candidate by using any known method for obtaining ridge directions.

For each singular point candidate detected from each intermediate image, the singular point candidate detecting unit 13 passes information identifying the type of the singular point (i.e., upward convex core, downward convex core, or delta singular point) to the singular point candidate distance calculating unit 14 together with the detected position of the singular point candidate on the intermediate image. When the directions of ridges in the vicinity of the singular point candidate are detected, the singular point candidate detecting unit 13 also passes the obtained ridge directions to the singular point candidate distance calculating unit 14. Further, when the candidates for both the upward convex core and the downward convex core are also detected, the singular point candidate detecting unit 13 may pass the direction vector directed from the upward convex core to the downward convex core as the vector representing the direction of the upward convex core to the singular point candidate distance calculating unit 14 together with the information concerning the singular point candidate for the upward convex core. Likewise, the singular point candidate detecting unit 13 may pass the direction vector directed from the downward convex core to the upward convex core as the vector representing the direction of the downward convex core to the singular point candidate distance calculating unit 14 together with the information concerning the singular point candidate for the downward convex core.

Further, the singular point candidate detecting unit 13 notifies the quality judging unit 15 of the number of singular point candidates detected from each intermediate image for each type of singular point.

The singular point candidate distance calculating unit 14 calculates the singular point candidate distance representing the distance between a singular point candidate detected from the first intermediate image as a candidate for a given singular point of the biometric input information and the corresponding singular point candidate detected from the second intermediate image.

Since the first and second intermediate images are both generated from the biometric input image, if the biometric input image is sufficiently clear, the same type of singular point candidate will, with high probability, be detected at the same position on the first and second intermediate images. On the other hand, if part or all of the biometric input image is blurred, the feature contained in the blurred region may appear different between the first and second intermediate images, because the kind of image processing used to generate the intermediate image differs between the first and second intermediate images.

Figure 4A:
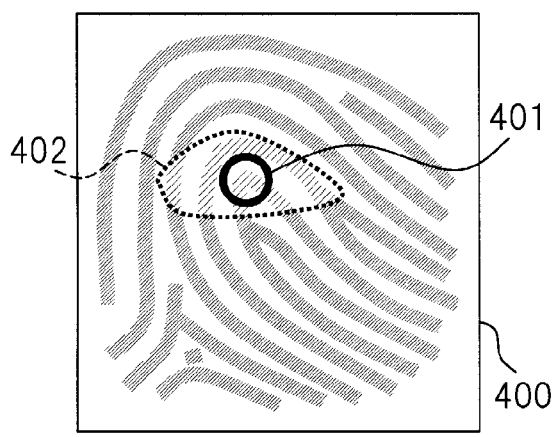
FIGS. 4A to 4C are diagrams illustrating examples of a biometric input image, a first intermediate image, and a second intermediate image, respectively.
Figure 4B:
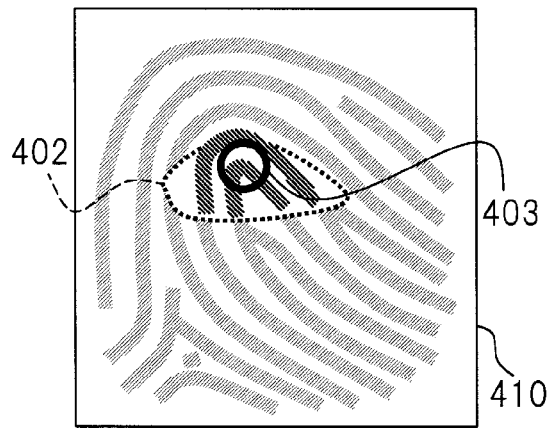
Figure 4C:
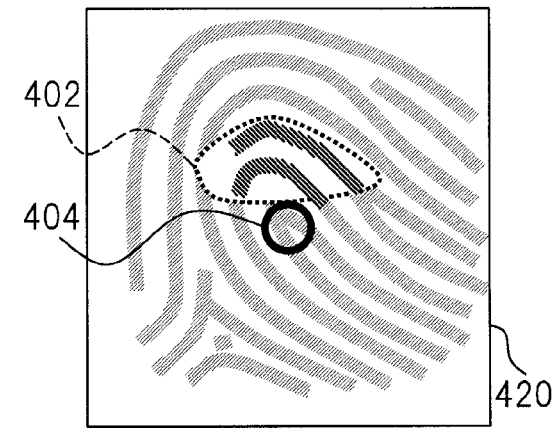

FIGS. 4A to 4C are diagrams illustrating examples of the biometric input image, the first intermediate image, and the second intermediate image, respectively.

In the biometric input image 400 illustrated in FIG. 4A, a region 402 which contains the upward convex core 401 is blurred. In the first intermediate image 410 illustrated in FIG. 4B, the ridges contained in the blurred region 402 appear the same as the ridges contained in the blurred region 402 of the biometric input image 400. As a result, the upward convex core candidate 403 is detected at the same position as the upward convex core 401 on the biometric input image 400. On the other hand, in the second intermediate image 420 illustrated in FIG. 4C, the ridge structure in the blurred region 402 appears different from the ridge structure in the blurred region 402 of the biometric input image 400 because of the image processing applied to it. As a result, the upward convex core candidate 404 is detected at a position different from the position of the upward convex core 401 on the biometric input image 400.

In this way, the position, or type, etc., of the singular point candidate detected for the same singular point of the biometric input information may not match between the two intermediate images. In certain cases, the singular point candidate for such a singular point may not be detected from one or the other of the intermediate images. In view of this, the singular point candidate distance provides useful information for measuring the quality of the biometric input image.

For example, the singular point candidate distance calculating unit 14 pairs a designated one of the singular point candidates detected from the first intermediate image with a corresponding singular point candidate located nearest to that designated singular point candidate and detected from the second intermediate image. When forming such a candidate pair, the singular point candidate distance calculating unit 14 may exclude, among the singular point candidates detected from one intermediate image, any singular point candidate already paired with one of the singular point candidates detected from the other intermediate image. Further, the singular point candidate distance calculating unit 14 may not pair up singular point candidates of different types.

The singular point candidate distance calculating unit 14 determines the singular point candidate distance by calculating the Euclidean distance between the paired singular point candidates. Alternatively, the singular point candidate distance calculating unit 14 may determine the singular point candidate distance by calculating the distance between multidimensional vectors having the differences in horizontal and vertical positions between the two singular point candidates, the difference between the directions, and the difference between the directions of the ridges in the neighbor regions, respectively, as the elements.

Further, for each type of singular point, the singular point candidate distance calculating unit 14 calculates the number of singular point candidates unable to be paired.

The singular point candidate distance calculating unit 14 passes the singular point candidate distance calculated for each pair to the quality judging unit 15 together with the number of singular point candidates unable to be paired.

The quality judging unit 15 judges whether or not the biometric input image generated by the biometric information acquiring unit 3 is suitable to use for matching. For this purpose, the quality judging unit 15 calculates a metric that indicates the quality of the biometric input image, based on the singular point candidate distance, the number of detected singular point candidates for each type of singular point, and the number of singular point candidates unable to be paired as candidate pairs.

For example, the quality judging unit 15 calculates the quality metric Q for the biometric input image in accordance with the following equation.

$$Q = A \times \left( \sum_{i=0}^{N-1} (1 - d_i) / \max(N_1, N_2) \right) \quad (1)$$

$$d_i = \begin{cases} \delta_i / \delta_{max} & \delta_i \leq \delta_{max} \\ 1 & \delta_i > \delta_{max} \end{cases}$$

where N represents the number of singular point candidate pairs, and $\delta_i$ indicates the singular point candidate distance between a given pair, i, of singular point candidate (i=0, 1, ..., N−1). Further, $\delta_{max}$ indicates the normalization reference value of the singular point candidate distance, and is set, for example, equal to the maximum value of the singular point candidate distance empirically obtained for one particular singular point on the biometric input image. On the other hand, $N_1$ and $N_2$ represent the number of singular point candidates detected from the first intermediate image and the number of singular point candidates detected from the second intermediate image, respectively. The function $\max(N_1, N_2)$ is a function that outputs $N_1$ or $N_2$, whichever is larger in value. Further, A is a coefficient that is determined in accordance with the number of singular point candidates not formed in pairs or the number of singular point candidates believed to be erroneously detected.

In equation (1), the maximum amount of positional displacement between the biometric input image and the registered biometric image, which corresponds to the search range within which a search is made for the position where the two images best match, may be used instead of $\delta_{max}$. For example, let Lx denote the maximum amount of positional displacement in the horizontal, and Ly denote the maximum amount of positional displacement in the vertical displacement; then, Lx or Ly, whichever is larger, may be used instead of $\delta_{max}$.

The coefficient A is set smaller as the number of singular point candidates detected from each intermediate image for a particular type of singular point becomes larger than the maximum number of singular points that can generally exist on one fingerprint for that particular type of singular point. For example, generally, no more than one upward convex core can exist on one fingerprint. On the other hand, generally, no more than two downward convex cores or two delta singular points can exist on one fingerprint. In view of this, the quality judging unit 15 compares the number of singular point candidates detected from the first intermediate image or the number of singular point candidates detected from the second intermediate image for each particular type of singular point, whichever is larger, with the maximum number of singular points that can generally exist on one fingerprint for that particular type of singular point. Then, the quality judging unit 15 determines the coefficient A, for example, by multiplying by 0.1 the total number $N_e$ of singular point candidates that exceeded the maximum number for each type of singular point, subtracting the resulting product from 1, and multiplying the difference $(1-0.1 \times N_e)$ by a reference value $A_0$ (for example, 1). If the total number $N_e$ of singular point candidates that exceeded the maximum number is 0, the quality judging unit 15 takes the reference value $A_0$ itself as the coefficient A.

Alternatively, the quality judging unit 15 may determine the coefficient A by multiplying by 0.1 the number $N_f$ of singular point candidates not formed in pairs, subtracting the resulting product from 1, and multiplying the difference $(1-0.1 \times N_f)$ by the reference value $A_0$. Further alternatively, the quality judging unit 15 may determine the coefficient A by multiplying by 0.1 the sum of the total number $N_e$ of singular point candidates that exceeded the maximum number and the number $N_f$ of singular point candidates not formed in pairs, subtracting the resulting product from 1, and multiplying the difference $(1-0.1 \times (N_e+N_f))$ by the reference value $A_0$.

The quality judging unit 15 compares the calculated quality metric Q with a predefined threshold value T. If the quality metric Q is equal to or higher than the threshold value T, the quality judging unit 15 judges that the biometric input image is suitable to use for matching. If the quality metric Q is lower than the threshold value T, the quality judging unit 15 judges that the biometric input image is unsuitable to use for matching. The predefined threshold value T is empirically determined, for example, as the limit value of the quality metric Q for the biometric image that sets the lower limit at which the false rejection rate can be held within tolerance when the biometric image is used for matching.

The quality judging unit 15 passes the result of the quality judgment to the processing unit 6.

When the result of the judgment indicating that the biometric input image is unsuitable to use for matching is received from the processing unit 6, the guidance processing unit 16 retrieves from the storage unit 5 a guidance message for prompting the user to reenter the biometric input information.

Then, the guidance processing unit 16 displays the guidance message on the display unit 2. If the biometric information processing apparatus 1 is equipped with a speaker, the guidance processing unit 16 may reproduce the guidance message through the speaker to alert the user audibly.

The guidance processing unit 16 may also display the biometric input image judged unsuitable or either one of the intermediate images on the display unit 2 so that the image provides guidance for positioning the user's body part when the user reenters the biometric input information.

When the biometric input image and the identification information of the user are received from the processing unit 6, the matching unit 17 retrieves from the storage unit 5 the data concerning the registered biometric information associated with the identification information of the user. Then, the matching unit 17 matches the biometric input information against the registered biometric information represented by the retrieved data. The matching unit 17 obtains, as a result of the matching, the degree of similarity indicating the degree to which the biometric input information is similar to the registered biometric information. The matching unit 17 may use the first intermediate image or the second intermediate image instead of the biometric input image.

The matching unit 17 may use matching techniques such as minutiae matching or pattern matching.

When performing the matching between the biometric input information and the registered biometric information by minutiae matching, the matching unit 17 extracts feature points for matching purposes from the biometric input information. Then, the matching unit 17 performs the matching by using the feature points extracted from the biometric input information and the plurality of feature points extracted from the registered biometric information and stored in the storage unit 5 as the data concerning the registered biometric information.

The matching unit 17 extracts, for example, fingerprint ridge properties such as ridge endings and bifurcations as the feature points (minutiae) for matching. To extract the ridge bifurcations and endings from the biometric input image, the matching unit 17 generates a binarized image with thinned ridges from the biometric input image. After that, the matching unit 17 scans the thinned biometric input image by using a plurality of mask patterns, and detects the position on the biometric input image where it matches one of the mask patterns. Then, the matching unit 17 extracts the pixel at the center of the detected position as a feature point. Each mask pattern used here is represented, for example, by 3×3 pixels, and has a binary pattern corresponding to a ridge bifurcation or ending. Further, the matching unit 17 obtains the position of the extracted feature point and the ridge direction near the feature point as the information representing the feature point. The matching unit 17 can use any known method in order to obtain the ridge direction near the feature point.

Feature points are also extracted from the registered biometric image by performing the same processing as that performed on the biometric input image, and the position of each extracted feature point and the ridge direction near the feature point are stored in the storage unit 5.

The matching unit 17 may extract the feature points from the biometric input image by using any other known method that obtains ridge endings or bifurcations as feature points.

The matching unit 17 selects, as a first reference feature point, the feature point located at or near the center of the region representing the registered biometric information in the registered biometric image. Further, the matching unit 17 selects one of the feature points extracted from the biometric input image as a second reference feature point. Then, the matching unit 17 shifts the biometric input image so as to bring the second reference feature point into registry with the first reference feature point. The matching unit 17 may select singular points such as a upward convex core or a downward convex core as the first and second reference feature points. After that, while rotating the biometric input image, the matching unit 17 obtains the number of feature points on the biometric input image that match the feature points on the registered biometric image. By repeating the above process while changing the combination of the first reference feature point and the second reference feature point, the matching unit 17 obtains the maximum number of feature points on the biometric input image that match the feature points on the registered biometric image.

Finally, the matching unit 17 computes the degree of similarity by dividing that maximum number by the total number of feature points extracted from the biometric input image. In this case, the degree of similarity takes any value between 0 and 1, and the higher the degree of similarity between the biometric input information and the registered biometric information, the closer to 1 the value of the degree of similarity.

To detect the feature points of the biometric input information that match the feature points of the registered biometric information, the matching unit 17 examines whether there is any feature point of the registered biometric information within a predetermined range centered at the position of an attention feature point of the biometric input information. The predetermined range here may be chosen to have a value equivalent, for example, to the average spacing between two adjacent ridges. If there is any feature point of the registered biometric information within the predetermined range centered at the position of the attention feature point, the matching unit 17 obtains the angle difference between the ridge directions near the respective feature points. If the absolute angle difference between the ridge directions falls within a predetermined angle range, the matching unit 17 determines that the feature point of the registered biometric information matches the attention feature point of the biometric input information. The predetermined angle range here is chosen to have a value corresponding to an allowable range within which the ridge direction near the attention feature point can be considered to match the ridge direction near the corresponding feature point of the registered biometric information, and may be set, for example, to 10 degrees. The matching unit 17 may determine that the feature point of the registered biometric information that matches the attention feature point of the biometric input information exists, only when the feature point of the registered biometric information located within the predetermined range centered at the position of the attention feature point is of the same kind as the attention feature point. The matching unit 17 may use other known methods to obtain the number of feature points of the registered biometric information that match the feature points of the biometric input information.

On the other hand, when performing the matching between the biometric input information and the registered biometric information by pattern matching, the matching unit 17 uses the biometric input image and the registered biometric image stored in the storage unit 5 as the data concerning the registered biometric information. Then, while variously changing the position of the biometric input image relative to the registered biometric image, the matching unit 17 computes the correlation c(i, j) between the biometric input image and the registered biometric image by using the following equation.

$$c(i, j) = \frac{\sum_x \sum_y \{(I(x, y) - I_{av})(T(x - i, y - j) - T_{av})\}}{\sqrt{\sum_x \sum_y (I(x, y) - I_{av})^2 \sum_x \sum_y (T(x - i, y - j) - T_{av})^2}} \qquad (2)$$

where I(x, y) represents the pixel value of a pixel contained in the biometric input image and located at a position designated by a horizontal coordinate x and a vertical coordinate y. Further, T(x-i, y-i) represents the pixel value of a pixel contained in the registered biometric image and located at a position designated by a horizontal coordinate (x-i) and a vertical coordinate (y-i). On the other hand, $I_{av}$ is the average pixel value of the pixels contained in the biometric input image, while $T_{av}$ is the average pixel value of the pixels contained in the registered biometric image. Here, i and j each indicate the amount of displacement between the biometric input image and the registered biometric image in the horizontal direction or the vertical direction, respectively. Further, c(i, j) represents the correlation value when the biometric input image is displaced relative to the registered biometric image by i pixels in the horizontal direction and j pixels in the vertical direction. The correlation value c(i, j) can take any value between −1 and 1. The correlation value c(i, j) is 1 when the biometric input image perfectly matches the registered biometric image. On the other hand, when the biometric input image is completely reversed with respect to the registered biometric image, the correlation value c(i, j) is −1.

The matching unit 17 passes the computed degree of similarity to the authentication judging unit 18 together with the identification information of the registered user.

If the degree of similarity is equal to or greater than an authentication judging threshold value, the authentication judging unit 18 judges that the biometric input information matches the registered biometric information. Then, the authentication judging unit 18 authenticates the user as being the registered user that matches the identification information entered via the input unit 4. When the user is authenticated, the authentication judging unit 18 reports the result of the authentication to the processing unit 6. Then, the processing unit 6 permits the authenticated user to use the apparatus equipped with the biometric information processing apparatus 1 or the apparatus connected to the biometric information processing apparatus 1.

On the other hand, if the degree of similarity is smaller than the authentication judging threshold value, the authentication judging unit 18 judges that the biometric input information does not match the registered biometric information. In this case, the authentication judging unit 18 does not authenticate the user. The authentication judging unit 18 notifies the processing unit 6 of the result of the authentication indicating the failure to authenticate the user. The processing unit 6 denies the unauthenticated user an access to the apparatus equipped with the biometric information processing apparatus 1 or the apparatus connected to the biometric information processing apparatus 1. Further, the processing unit 6 causes the display unit 2 to display a message indicating that the authentication has failed.

It is preferable to set the authentication judging threshold value to such a value that the authentication judging unit 18 succeeds to authenticate the user only when the user is a legitimate registered user. It is also preferable to set the authentication judging threshold value to such a value that the authentication judging unit 18 fails to authenticate the user when the user is a person other than a legitimate registered user. For example, the authentication judging threshold value may be determined by multiplying the difference between the maximum and minimum values that the degree of similarity can take by 0.7 and adding the resulting product to the minimum value of the degree of similarity.

Figure 5:
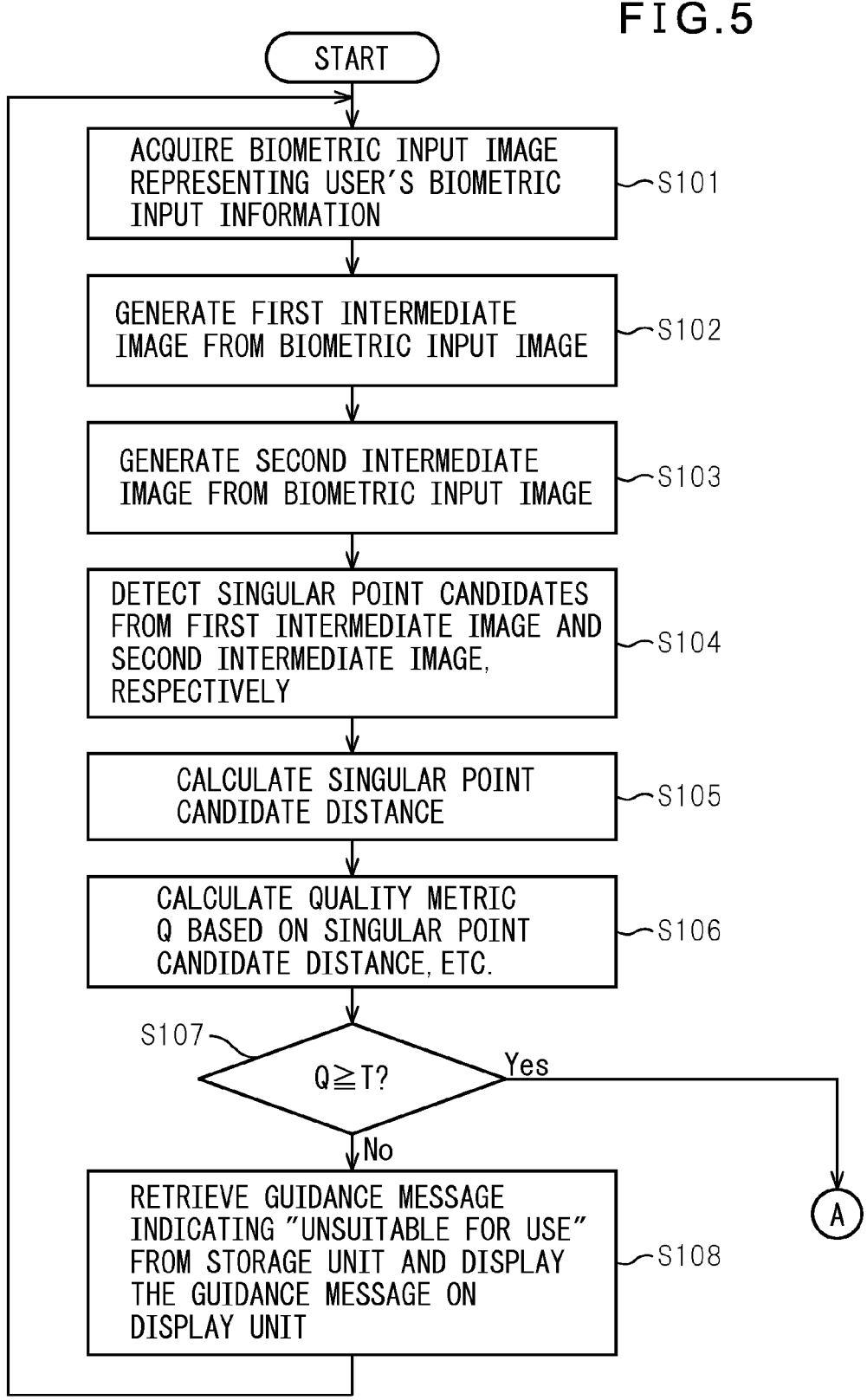
FIG. 5 is an operation flowchart of a biometric authentication process which is performed under the control of a computer program executed on the processing unit.
Figure 6:
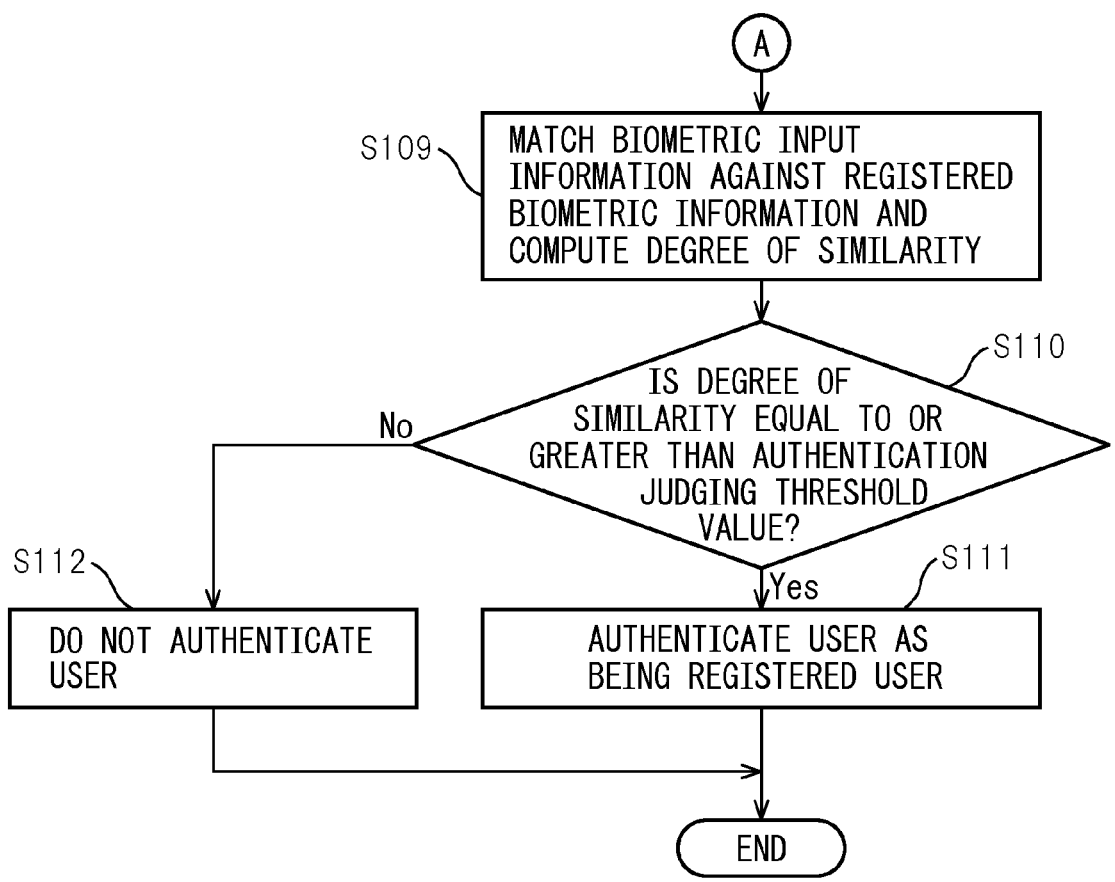
FIG. 6 is an operation flowchart of the biometric authentication process which is performed under the control of the computer program executed on the processing unit.

FIGS. 5 and 6 are an operation flowchart of the biometric authentication process which is performed under the control of a computer program executed on the processing unit 6.

As illustrated in FIG. 5, the processing unit 6 acquires a biometric input image representing the user's biometric input information from the biometric information acquiring unit 3 (step S101). The processing unit 6 passes the biometric input image to the first intermediate image generating unit 11 and the second intermediate image generating unit 12 in the processing unit 6.

The first intermediate image generating unit 11 generates the first intermediate image by applying image processing to the biometric input image for correcting any blurred region contained in the biometric input image (step S102). The second intermediate image generating unit 12 generates the second intermediate image by applying image processing to the biometric input image for eliminating noise from the biometric input image (step S103). The first intermediate image generating unit 11 and the second intermediate image generating unit 12 pass the respectively generated intermediate images to the singular point candidate detecting unit 13 in the processing unit 6.

The singular point candidate detecting unit 13 detects singular point candidates from the first intermediate image and the second intermediate image, respectively (step S104). The singular point candidate detecting unit 13 passes information concerning the singular point candidates detected from the respective intermediate images (for example, the position, type, and direction of each singular point candidate, and the ridge direction near the singular point candidate) to the singular point candidate distance calculating unit 14 in the processing unit 6. Further, the singular point candidate detecting unit 13 passes the number of singular point candidates detected for each type of singular point to the quality judging unit 15 in the processing unit 6.

From among the singular point candidates detected from the first intermediate image and the singular point candidates detected from the second intermediate image, the singular point candidate distance calculating unit 14 forms singular point candidate pairs each by selecting the singular point candidates corresponding to the same singular point on the biometric input image. Then, the singular point candidate distance calculating unit 14 calculates the singular point candidate distance representing the distance between the singular point candidates forming each pair (step S105). The singular point candidate distance calculating unit 14 passes the singular point candidate distance calculated for each pair to the quality judging unit 15 together with the number of singular point candidates unable to be paired.

The quality judging unit 15 calculates the quality metric Q for the biometric input image, based on the singular point candidate distance calculated for each pair, the number of detected singular point candidates for each type of singular point, and the number of singular point candidates unable to be paired (step S106). The quality judging unit 15 then judges whether or not the quality metric Q is equal to or higher than the predefined threshold value T (step S107).

If the quality metric Q is lower than the predefined threshold value T (No in step S107), the quality judging unit 15 judges that the biometric input image is unsuitable to use for matching. The quality judging unit 15 returns the result of the judgment to the processing unit 6.

The processing unit 6 notifies the guidance processing unit 16 that the biometric input image has been judged unsuitable to use for matching. The guidance processing unit 16 that received the notification from the processing unit 6 retrieves from the storage unit 5 a guidance message indicating that the biometric input image has been judged unsuitable for use. The guidance processing unit 16 displays the guidance message on the display unit 2 (step S108). After that, the processing unit 6 returns control to step S101, and acquires from the biometric information acquiring unit 3 a biometric input image re-generated by rereading the user's body part. After step S101, the processing unit 6 repeats the above process.

On the other hand, if the quality metric Q is equal to or higher than the predefined threshold value T (Yes in step S107), the quality judging unit 15 judges that the biometric input image is suitable to use for matching. The quality judging unit 15 returns the result of the judgment to the processing unit 6.

As illustrated in FIG. 6, the processing unit 6 passes the biometric input image to the matching unit 17 together with the identification information of the user. The matching unit 17 that received the biometric input image and the identification information of the user retrieves from the storage unit 5 the data concerning the registered biometric information associated with the identification information of the user. Then, the matching unit 17 matches the biometric input information represented by the biometric input image against the registered biometric information represented by the retrieved data. The matching unit 17 then computes the degree of similarity between the biometric input information and the registered biometric information (step S109). The matching unit 17 passes the computed degree of similarity to the authentication judging unit 18 together with the identification information of the user.

The authentication judging unit 18 judges whether or not the degree of similarity is equal to or greater than the authentication judging threshold value (step S110).

If the degree of similarity is equal to or greater than the authentication judging threshold value (Yes in step S110), the authentication judging unit 18 authenticates the user as being the registered user that matches the entered identification information (step S111).

On the other hand, if the degree of similarity is smaller than the authentication judging threshold value (No in step S110), the authentication judging unit 18 does not authenticate the user (step S112).

After step S111 or S112, the processing unit 6 terminates the biometric authentication process.

The processing unit 6 may execute the steps S103 and S104 concurrently. Alternatively, the order of the steps S103 and S104 may be interchanged.

As has been described above, the biometric information processing apparatus according to the first embodiment detects candidates for the singular points representing the characteristic features of the biometric information from the two kinds of intermediate images generated by applying different kinds of image processing to the biometric input image. Then, if the distance between the singular point candidates believed to correspond to the same singular point on the biometric input information is large, the biometric information processing apparatus determines that the biometric input image is unsuitable to use for matching. Since the biometric information processing apparatus can thus determine whether the features of the biometric input information that are useful for matching have been clearly captured or not, the biometric information processing apparatus can acquire biometric information suitable for matching, while preventing unnecessary reacquisition of the biometric information.

Next, a biometric information processing apparatus which carries out a biometric authentication process according to a second embodiment will be described. The biometric information processing apparatus according to the second embodiment extracts a blurred region from the first intermediate image. Then, the biometric information processing apparatus enhances the accuracy of quality judgment of the biometric input image by reducing the confidence level for any singular point candidate detected from the blurred region or by not detecting any singular point candidate from the blurred region.

The biometric information processing apparatus according to the second embodiment is substantially the same as the biometric information processing apparatus according to the first embodiment, except for differences in some of the functions of the processing unit. Therefore, the functions of the processing unit in the biometric information processing apparatus according to the second embodiment will be described below by focusing on the differences from the functions of the processing unit in the biometric information processing apparatus according to the first embodiment.

Figure 7:
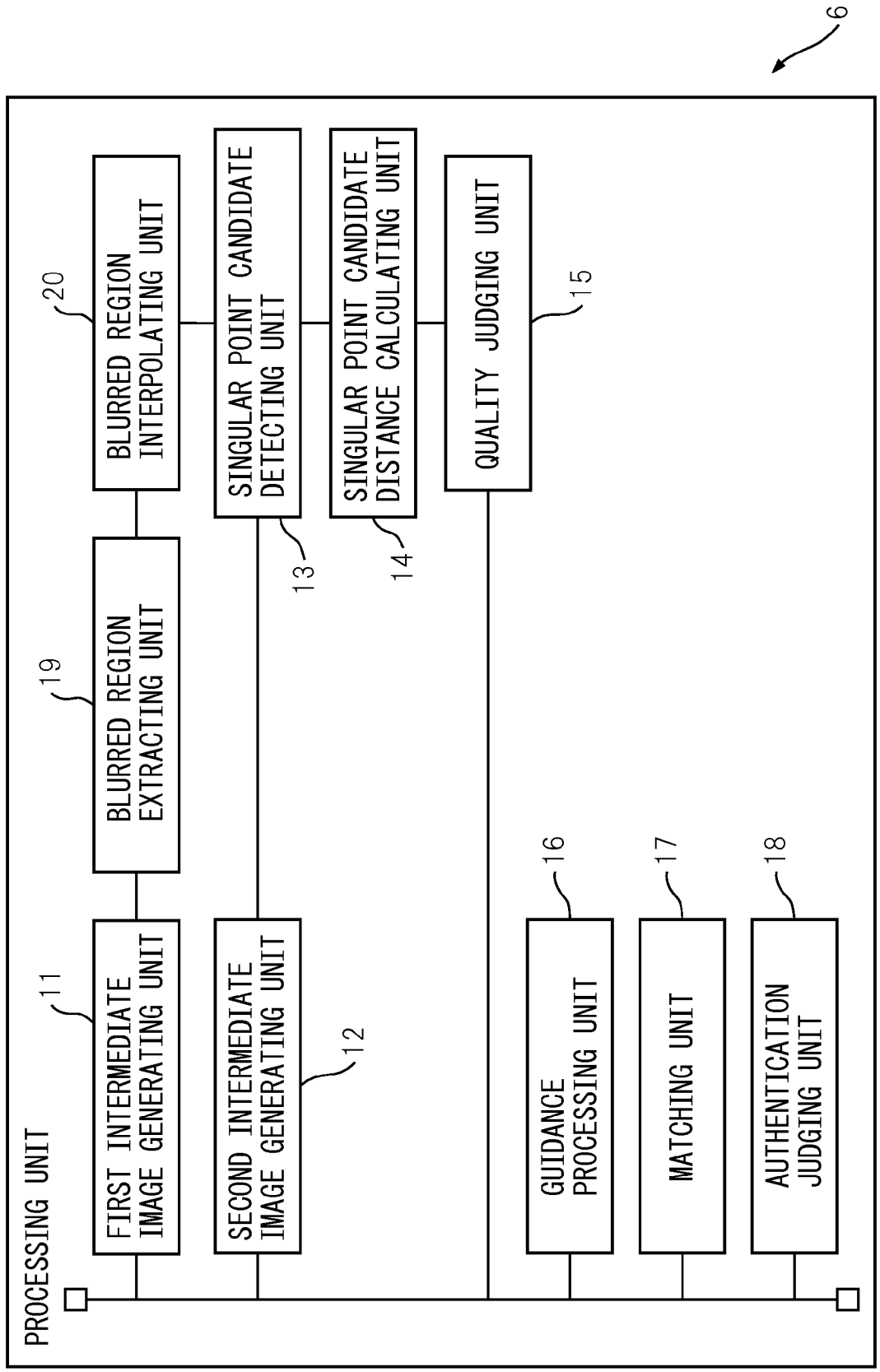
FIG. 7 is a functional block diagram of a processing unit incorporated in a biometric information processing apparatus according to a second embodiment, illustrating the functions to be implemented when performing a biometric authentication process to authenticate a user.

FIG. 7 is a functional block diagram of the processing unit incorporated in the biometric information processing apparatus according to the second embodiment. As illustrated in FIG. 7, the processing unit 6 includes a first intermediate image generating unit 11, a second intermediate image generating unit 12, a singular point candidate detecting unit 13, a singular point candidate distance calculating unit 14, a quality judging unit 15, a guidance processing unit 16, a matching unit 17, an authentication judging unit 18, a blurred region extracting unit 19, and a blurred region interpolating unit 20. In FIG. 7, the functional blocks of the processing unit 6 corresponding to those of the processing unit 6 illustrated in FIG. 2 are respectively designated by the same reference numerals.

Based on the first intermediate image, the blurred region extracting unit 19 extracts blurred regions from the region representing the biometric input information. In the present embodiment, the biometric input information is a fingerprint. Therefore, if the finger is pressed too tightly on the sensor, or if the skin on the surface of the finger is rough or is moistened with sweat, for example, the region carrying the fingerprint can become blurred because the physical difference between the ridges and valleys of the finger reduces. That is, in such a blurred region, the difference between the pixel value of the pixels corresponding to the ridges and the pixel value of the pixels corresponding to the valleys becomes small.

In view of the above, the blurred region extracting unit 19 divides the first intermediate image into a plurality of sub-regions and, based on the statistics of the pixel values in each sub-region, determines whether the sub-region is blurred or not. Preferably, each sub-region is chosen to have a size enough to contain several to a dozen or so ridges. The statistics include, for example, the average pixel value of each sub-region, the variance thereof, the difference between the maximum and minimum pixel values, etc. For example, if the variance in a sub-region of interest is lower than a low variance threshold value indicating that the pixel values are distributed within a narrow range, the blurred region extracting unit 19 may determine that the sub-region of interest is a blurred region; on the other hand, if the variance is not lower than the low variance threshold value, the blurred region extracting unit 19 may determine that the sub-region of interest is not a blurred region. The blurred region extracting unit 19 assigns each region of interest a blurring flag that indicates whether the region is a blurred region or not.

Alternatively, if the average pixel value of the sub-region of interest is larger than a lightness threshold value indicating that the average pixel value is on the light side, and if the variance is lower than the low variance threshold value, then the blurred region extracting unit 19 may determine that the sub-region of interest is a blurred light region. On the other hand, if the average pixel value of the sub-region of interest is lower than a darkness threshold value indicating that the average pixel value is on the dark side, and if the variance is lower than the low variance threshold value, then the blurred region extracting unit 19 may determine that the sub-region of interest is a blurred dark region. In this case, the blurred region extracting unit 19 may assign blurring flags of different values to the blurred light region and the blurred dark region, respectively, to distinguish the blurred light region from the blurred dark region. Further, if the variance is lower than the low variance threshold value, and if the average pixel value is not smaller than the darkness threshold value but not larger than the lightness threshold value indicating, the blurred region extracting unit 19 may determine that the region is a moderately blurred region to distinguish it from the blurred light region or the blurred dark region. In this case also, the blurred region extracting unit 19 assigns blurring flags of different values to the clear region, the blurred light region, the blurred dark region, and the moderately blurred region, respectively. Each threshold value here is, for example, optimized empirically.

Further, the blurred region extracting unit 19 may determine that the region on the first intermediate image where the biometric information is not captured is the background region to distinguish it from the other regions. For example, the blurred region extracting unit 19 determines that the region formed from pixels whose values are larger than the maximum pixel value or smaller than the minimum pixel value of the biometric region defined on the first intermediate image is the background region.

The blurred region extracting unit 19 may determine whether the region is burred or not on a pixel-by-pixel basis. In this case, the blurred region extracting unit 19 calculates the statistics of the pixel values in the same manner as above for a sub-region containing a designated pixel, and determines that the designated pixel is contained in a blurred region if the statistics satisfy the criteria for one of the above-described blurred regions.

The blurred region extracting unit 19 performs labeling and connects the sub-regions or pixels assigned the blurring flag of the same value among the neighboring sub-regions or pixels. Then, the blurred region extracting unit 19 assigns a different label to each blurred region formed by connecting such blurred sub-regions or pixels.

The blurred region extracting unit 19 calculates the degree of blurring for each blurred region assigned the label of the same value. The degree of blurring AL is calculated, for example, in accordance with the following equation.

$$AL = 1 - \frac{B_{max} - B_{min}}{L_{max} - L_{min}} \quad (3)$$

where $B_{max}$ is the maximum pixel value in the blurred region, and $B_{min}$ is the minimum pixel value in the blurred region. On the other hand, $L_{max}$ is the maximum value of the pixels of the biometric region in the entire first intermediate image, and $L_{min}$ is the minimum value of the pixels of the biometric region in the entire first intermediate image. When $B_{max}$ and $B_{min}$ are equal, that is, when the pixel values are uniform across the blurred region, the degree of blurring AL exhibits the highest value (1); on the other hand, when the difference between $B_{max}$ and $B_{min}$ is largest, i.e., when the contrast of the blurred region is equal to the contrast of the entire first intermediate image, the degree of blurring AL exhibits the lowest value (0). If, in the first intermediate image, the pixel values of a region corresponding to ridges are larger than the pixel values of a region corresponding to valleys, the median value or the average pixel value of the pixels corresponding to the ridges may be used as $B_{max}$ in equation (3), and the median value or the average pixel value of the pixels corresponding to the valleys may be used as $B_{min}$. In this case, the blurred region extracting unit 19 determines that any pixel whose value is larger than a threshold value obtained by performing discriminant analysis on the histogram of the pixel values taken over the blurred region is a pixel corresponding to a ridge, and that any pixel whose value is not larger than the threshold value is a pixel corresponding to a valley.

Alternatively, the blurred region extracting unit 19 may calculate the degree of blurring AL in accordance with the following equation instead of equation (3).

$$AL = 1 - \frac{B_{max} - B_{min}}{L_{max} - L_{min}} \quad (4)$$

where $\sigma_B$ is the standard deviation of the pixel values in the blurred region of interest, and $\alpha$ is a coefficient. For example, $\alpha$ is set to 2. If the degree of blurring AL calculated in accordance with equation (4) is smaller than 0, the blurred region extracting unit 19 may determine that the degree of blurring AL is 0. By determining the degree of blurring AL using the standard deviation in this manner, the blurred region extracting unit 19 can alleviate the effect that the noise contained in the blurred region may have on the degree of blurring AL. The blurred region extracting unit 19 may use the variance instead of the standard deviation.

Further, the blurred region extracting unit 19 may calculate the degree of blurring AL based on the confidence level of the direction of ridges in the blurred region of interest. For example, as disclosed in Japanese Laid-open Patent Publication No. H08-7097, the blurred region extracting unit 19 obtains an eigenvalue of a matrix V and an eigenvalue of a matrix M, as defined in the following equations, which are obtained based on the horizontal and vertical derivatives at each pixel in the blurred region of interest.

$$V = \begin{pmatrix} \sigma_{xx} & \sigma_{xy} \\ \sigma_{yx} & \sigma_{yy} \end{pmatrix} \quad (5)$$

$$\sigma_{pq} = \frac{1}{N_{total}} \sum_{x,y \in C} (f_p(x,y) - f_{pav}(x,y))(f_q(x,y) - f_{qav}(x,y))$$

$$M = \begin{pmatrix} \sum_{x,y \in C} f_x(x,y)^2 & \sum_{x,y \in C} f_x(x,y)f_y(x,y) \\ \sum_{x,y \in C} f_y(x,y)f_x(x,y) & \sum_{x,y \in C} f_y(x,y)^2 \end{pmatrix} \quad (6)$$

where f(x, y) represents the pixel value of the first intermediate image at a horizontal coordinate x and a vertical coordinate y. Further, $f_x(x, y)$ represents the horizontal derivative at the horizontal coordinate x and vertical coordinate y. Likewise, $f_y(x, y)$ represents the vertical derivative at the horizontal coordinate x and vertical coordinate y. On the other hand, $f_{xave}(x, y)$ and $f_{yave}(x, y)$ represent the average values of $f_x(x, y)$ and $f_y(x, y)$, respectively, in the blurred region C of interest. $N_{total}$ represents the total number of pixels in the blurred region C of interest.

Of the eigenvalues of the matrices V and M, the eigenvalue smaller in absolute value is denoted by $\lambda_1$ and the other by $\lambda_2$; then, the larger the amount of noise contained in the blurred region of interest, the larger the variation of the horizontal and vertical derivatives, and the smaller the difference between $\lambda_1$ and $\lambda_2$. In view of this, the blurred region extracting unit 19 may calculate the degree of blurring AL based on the confidence level of the local direction of ridges in the blurred region of interest in accordance with the following equation.

$$AL = |\lambda_1/\lambda_2| \quad (7)$$

Further, the blurred region extracting unit 19 may calculate the degree of blurring based on the confidence level of the global direction of ridges near the blurred region of interest in such a manner that the degree of blurring increases as the sum of the squares of the differences between the direction of ridges in the blurred region of interest and the direction of ridges in the neighbor region increases.

Further, the blurred region extracting unit 19 may calculate the degree of blurring for the blurred region of interest by taking a weighted average of the degrees of blurring calculated for the region of interest in accordance with the equations (3), (4), and (7), respectively. Alternatively, the blurred region extracting unit 19 may calculate the degree of blurring for the blurred region of interest by taking the largest value among the degrees of blurring calculated for the blurred region of interest in accordance with the equations (3), (4), and (7), respectively.

Further, the blurred region extracting unit 19 may calculate the degree of blurring for the region of interest by taking a weighted average of the degree of blurring $AL_1$ calculated based on the contrast, the degree of blurring $AL_2$ calculated based on the confidence level of the local direction of ridges, and the degree of blurring $AL_3$ calculated based on the confidence level of the global direction of ridges. In this case, the degree of blurring $AL_1$ based on the contrast is calculated in accordance with the equation (3) or (4). On the other hand, the degree of blurring $AL_2$ based on the confidence level of the local direction of ridges is calculated in accordance with the equation (7).

Alternatively, the blurred region extracting unit 19 may calculate the degree of blurring for the blurred region of interest by taking the largest value among $AL_1$, $AL_2$, and $AL_3$. In any case, the blurred region extracting unit 19 can calculate the degree of blurring AL so that it is normalized to a value between 0 and 1.

The blurred region extracting unit 19 may calculate the degree of blurring AL for each sub-region of the first intermediate image or for each pixel. Then, by performing labeling on the sub-regions or pixels whose degrees of blurring are equal to or greater than a predefined threshold value, the blurred region extracting unit 19 connects the sub-regions or pixels the absolute difference between whose degrees of blurring AL falls within a predefined range by selecting such sub-regions or pixels from among the sub-regions or pixels neighboring each other. The blurred region extracting unit 19 forms one blurred region from a set of sub-regions or pixels connected by labeling. Then, the blurred region extracting unit 19 calculates the degree of blurring for each blurred region by taking the average of the degrees of blurring calculated for the respective sub-regions or pixels contained in the blurred region. The predefined threshold value is empirically determined, for example, as a value corresponding to the degree of blurring with which the probability of failing to detect a singular point exceeds a permitted limit. On the other hand, the predefined range is a range within which the degrees of blurring of two regions can be regarded as being identical, and is set, for example, equal to one tenths of the maximum value of the degree of blurring.

The blurred region extracting unit 19 passes information representing each blurred region and the degree of blurring of each blurred region to the blurred region interpolating unit 20 as well as to the singular point candidate detecting unit 13 and the quality judging unit 15. The information representing the blurred region is, for example, an image having the same size as the first intermediate image and having a label number associated with the corresponding blurred region as the pixel value for each pixel.

Of the blurred regions extracted based on the first intermediate image, the blurred region interpolating unit 20 interpolates any blurred region that satisfies a prescribed condition by using information concerning its neighboring regions. For example, the blurred region interpolating unit 20 selects a blurred region whose degree of blurring is equal to or greater than a predefined threshold value, and determines the selected blurred regions as a candidate for a region to be interpolated, i.e., an interpolation candidate region. The predefined threshold value is empirically determined, for example, as a value corresponding to the degree of blurring with which the probability of failing to detect a singular point exceeds a permitted limit, as described above, and is set, for example, equal to one half of the maximum value of the degree of blurring.

There can also occur cases where the entire first intermediate image is blurred, making it difficult to distinguish between clear regions and blurred regions. In such cases, the blurred region interpolating unit 20 sets a threshold value for the extraction of an interpolation candidate region so that a region having a higher degree of blurring is extracted as a region to be interpolated. For example, using Ohtsu's automatic threshold determination method, the blurred region interpolating unit 20 determines the threshold value so that the variance in the degree of blurring within the interpolation candidate region and the variance in the degree of blurring within the other regions become small while the variance in the degree of blurring between the interpolation candidate region and the other regions becomes large. Then, the blurred region interpolating unit 20 extracts any blurred region having a degree of blurring greater than the determined threshold value as an interpolation candidate region.

If the area of the interpolation candidate region is equal to or smaller than a prescribed value, and if the entire circumference of the interpolation candidate region is surrounded by clear regions, the blurred region interpolating unit 20 takes the interpolation candidate region as an interpolation target region. The area threshold is empirically determined so that the maximum value of the difference between the position of a ridge created by interpolation within the interpolation target region and the position of the actual ridge is held, for example, to less than two to three times the ridge pitch.

There are also cases where the entire circumference of the interpolation candidate region is not surrounded by clear regions. For example, if there is a crack-like streak such as a deep wrinkle or scratch extending straight or in a crisscrossed fashion across the fingerprint, or if several valleys are filled with a liquid such as sweat, the interpolation candidate region is detected as a continuous elongated region extending from one end to the other end of the fingerprint region. In such cases, the blurred region interpolating unit 20 sets an attention sub-region or pixel within the interpolation candidate region.

Then, if the distance between two clear regions located opposite each other across the attention sub-region or pixel is not greater than a prescribed distance, the blurred region interpolating unit 20 may determine the interpolation candidate region as an interpolation target region. The prescribed distance is set, for example, equal to several times the ridge pitch.

When the interpolation target region is determined, the blurred region interpolating unit 20 interpolate the interpolation target region in such a manner that each ridge or valley in the interpolation target region is continuous with the corresponding ridge or valley in each region neighboring the interpolation target region. For example, the blurred region interpolating unit 20 calculates the position and direction of each ridge in each region neighboring the interpolation target region. For example, the blurred region interpolating unit 20 binarizes each neighboring region by transforming it into pixels having a pixel value corresponding to a ridge and pixels having a pixel value corresponding to a valley. Then, by examining the position of the pixel corresponding to the ridge at the boundary with the interpolation target region and the direction in which the pixel corresponding to the ridge is continuous, the blurred region interpolating unit 20 can calculate the position and direction of each ridge in each region neighboring the interpolation target region.

The blurred region interpolating unit 20 determines the direction in which each ridge in the neighboring region is to be extended into the interpolation target region, by determining a multidimensional polynomial corresponding to each ridge by using, for example, spline interpolation. The blurred region interpolating unit 20 may also determine the position and direction of each ridge in the interpolation target region by performing interpolation repeatedly in such a manner as to work from the outer circumference of the interpolation target region toward the inside thereof.

Further, the blurred region interpolating unit 20 may obtain the positions and directions of a plurality of ridges from a sufficiently large region in the neighborhood of the interpolation target region so that the interpolated ridges do not overlap each other. Then, the blurred region interpolating unit 20 may determine the positions and directions of the ridges in the interpolation target region by applying the positions and directions of the plurality of ridges to the multidimensional polynomial.

There are also cases where the position and direction of each ridge can be calculated within the interpolation target region. Then, the blurred region interpolating unit 20 may use the direction of the ridge within the interpolation target region to determine the direction of the ridge to be interpolated. For example, the blurred region interpolating unit 20 may determine the direction of the ridge in a designated region within the interpolation target region in accordance with the following equation.

$$\phi = (1-AL)\phi_i + AL\phi_e \quad (8)$$

where $\phi$ indicates the direction of the ridge interpolated in the designated region. Further, $\phi_i$ indicates the direction of the ridge calculated from the designated region, while $\phi_e$ indicates the direction of the ridge in the designated region which is estimated from a clear region in the neighborhood of the designated region by using, for example, spline interpolation as earlier described. AL represents the degree of blurring of the designated region. This AL is normalized to a value within a range of 0 to 1. In equation (8), the value obtained by subtracting from the degree of blurring AL of the designated region the degree of blurring of the clear region from which $\phi_e$ has been obtained may be used instead of the AL.

By determining the ridge direction so that the ridge direction estimated from the interpolation target region is also better reflected as its degree of blurring is lower, the blurred region interpolating unit 20 can interpolate the interpolation target region with higher accuracy. In particular, when the interpolation target region is large enough that the ridge direction can be identified to some degree within the interpolation target region, the interpolation target region can be accurately interpolated.

Instead of interpolating the interpolation target region by reference to the ridge, the blurred region interpolating unit 20 may interpolate the interpolation target region by reference to the valley.

After completing the interpolation, the blurred region interpolating unit 20 passes the first intermediate image to the singular point candidate detecting unit 13. The blurred region interpolating unit 20 may also pass information indicating blurred regions not interpolated to the singular point candidate detecting unit 13.

After the interpolation is completed, the singular point candidate detecting unit 13 detects singular points from the first intermediate image and the second intermediate image, respectively, as in the first embodiment. However, the singular point candidate detecting unit 13 need not necessarily detects singular points from any blurred region whose degree of blurring is greater than a predefined threshold value or from any blurred region not interpolated. The predefined threshold value is empirically determined, for example, as a value corresponding to the degree of blurring above which the accuracy of singular point detection drops below a permitted level.

The singular point candidate distance calculating unit 14 calculates, as in the first embodiment, the singular point candidate distance representing the distance between each pair of singular point candidates, one detected from the first intermediate image and the other detected from the second intermediate image for the same singular point. Then, the singular point candidate distance calculating unit 14 passes the singular point candidate distance calculated for each pair and the number of singular point candidates unable to be paired to the quality judging unit 15.

As in the first embodiment, the quality judging unit 15 calculates the quality metric Q for the biometric input image, and judges the quality of the biometric input image based on the quality metric Q. In the present embodiment, the quality judging unit 15 calculates the quality metric Q in such a manner as to set the quality metric Q lower as the degree of blurring of the region from which the singular point is detected increases. For example, the quality judging unit 15 calculates the quality metric Q in accordance with the following equation instead of the equation (1).

$$Q = A \times \left( \sum_{i=0}^{N-1} (1-d_i)(1-AL_i) / \max(N_1, N_2) \right) \quad (9)$$

$$d_i = \begin{cases} \delta_i / \delta_{max} & \delta_i \leq \delta_{max} \\ 1 & \delta_i > \delta_{max} \end{cases}$$

where N represents the number of singular point candidate pairs, and $\delta_i$ indicates the singular point candidate distance between a given pair, i, of singular point candidate (i=0, 1, ..., N−1). Further, $\delta_{max}$ indicates the normalization reference value of the singular point candidate distance, and is set, for example, equal to the maximum value of the singular point candidate distance empirically obtained for one particular singular point on the biometric input image. $AL_i$ indicates the degree of blurring of the region that contains the singular point detected from the first intermediate image for the given pair, i, of singular point candidate. If the region to which the singular point belongs is a clear region, and the degree of blurring is not obtained for that region, the quality judging unit 15 determines the degree of blurring of that region as being 0. On the other hand, $N_1$ and $N_2$ represent the number of singular point candidates detected from the first intermediate image and the number of singular point candidates detected from the second intermediate image, respectively. The function $\max(N_1, N_2)$ is a function that outputs $N_1$ or $N_2$, whichever is larger in value. Further, A is a coefficient that is determined in accordance with the number of singular point candidates not formed in pairs or the number of singular point candidates believed to be erroneously detected; the coefficient A is determined in the same manner as the coefficient A in the equation (1).

In the equation (9) also, the maximum amount of positional displacement between the biometric input image and the registered biometric image, which corresponds to the search range within which a search is made for the position where the two images best match, may be used instead of $\delta_{max}$.

As in the first embodiment, the quality judging unit 15 compares the calculated quality metric Q with the predefined threshold value T. If the quality metric Q is equal to or higher than the threshold value T, the quality judging unit 15 judges that the biometric input image is suitable to use for matching. If the quality metric Q is lower than the threshold value T, the quality judging unit 15 judges that the biometric input image is unsuitable to use for matching. The quality judging unit 15 passes the result of the quality judgment to the processing unit 6.

When the result of the judgment indicating that the biometric input image is unsuitable to use for matching is received from the processing unit 6, the guidance processing unit 16 retrieves from the storage unit 5 a guidance message for prompting the user to reenter the biometric input information. Then, the guidance processing unit 16 displays the guidance message on the display unit 2.

Figure 8:
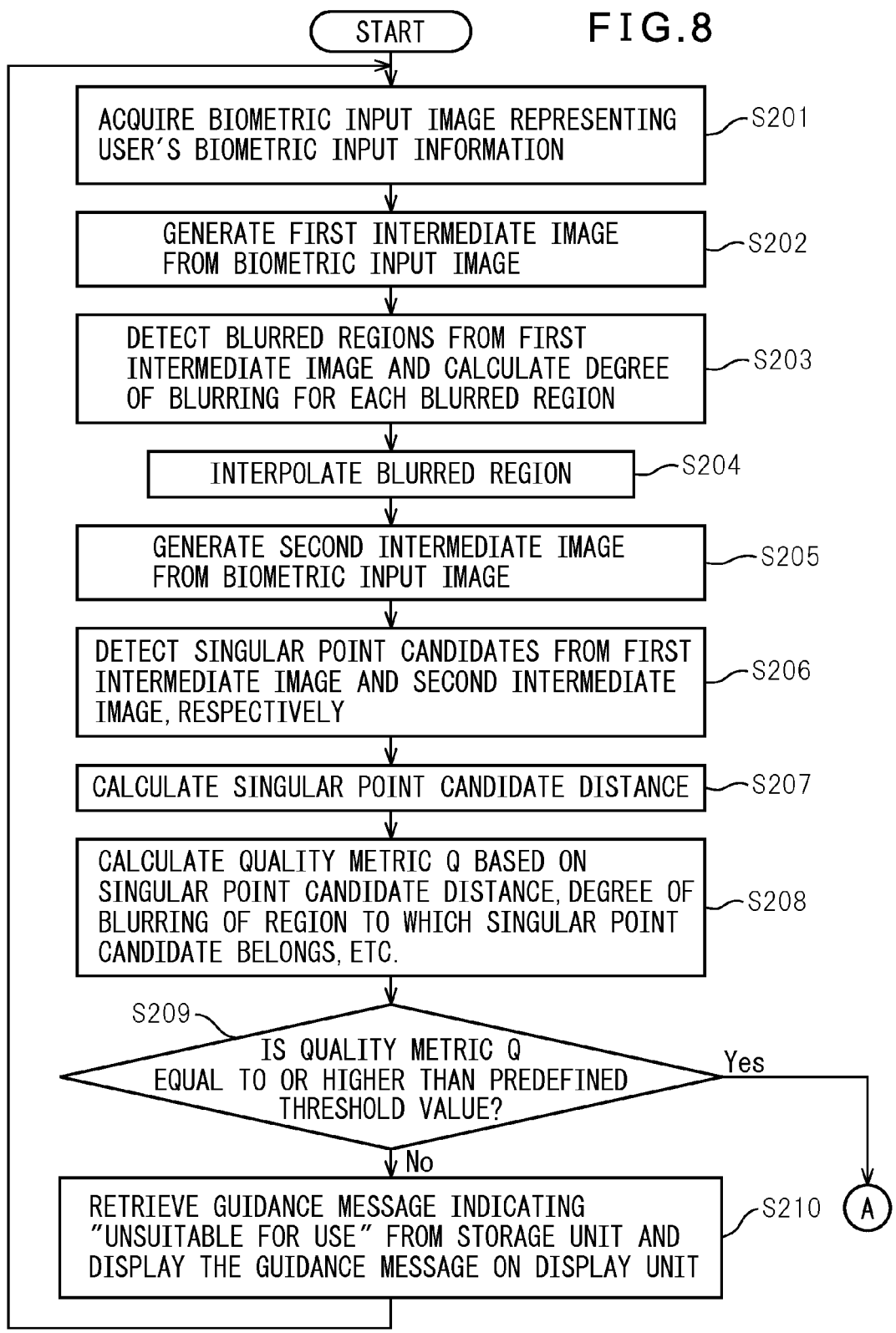
FIG. 8 is an operation flowchart of a biometric input image quality judging process which is performed under the control of a computer program executed on the processing unit.

FIG. 8 is an operation flowchart of the biometric input image quality judging process which is performed under the control of a computer program executed on the processing unit 6.

The processing unit 6 acquires a biometric input image representing the user's biometric input information from the biometric information acquiring unit 3 (step S201). The processing unit 6 passes the biometric input image to the first intermediate image generating unit 11 and the second intermediate image generating unit 12 in the processing unit 6.

The first intermediate image generating unit 11 generates the first intermediate image by applying image processing to the biometric input image for correcting any blurred region contained in the biometric input image (step S202). Then, the first intermediate image generating unit 11 passes the first intermediate image to the blurred region extracting unit 19 in the processing unit 6. The blurred region extracting unit 19 detects blurred regions from the first intermediate image and calculates the degree of blurring for each blurred region (step S203). Then, the blurred region extracting unit 19 passes information representing each blurred region and the degree of blurring of each blurred region to the blurred region interpolating unit 20 as well as to the singular point candidate detecting unit 13 and the quality judging unit 15 in the processing unit 6. Of the blurred regions detected, the blurred region interpolating unit 20 interpolates any blurred region that satisfies a prescribed condition (step S204). The prescribed condition has already been described in connection with the blurred region interpolating unit 20. After completing the interpolation, the blurred region interpolating unit 20 passes the first intermediate image to the singular point candidate detecting unit 13.

The second intermediate image generating unit 12 generates the second intermediate image by applying image processing to the biometric input image for eliminating noise from the biometric input image (step S205). The second intermediate image generating unit 12 passes the second intermediate image to the singular point candidate detecting unit 13.

The singular point candidate detecting unit 13 detects singular point candidates from the first intermediate image and the second intermediate image, respectively (step S206). The singular point candidate detecting unit 13 passes information concerning the singular point candidates detected from the respective intermediate images (for example, the position, type, and direction of each singular point candidate, and the ridge direction near the singular point candidate) to the singular point candidate distance calculating unit 14 in the processing unit 6. Further, the singular point candidate detecting unit 13 passes the number of singular point candidates detected for each type of singular point to the quality judging unit 15 in the processing unit 6.

From among the singular point candidates detected from the first intermediate image and the singular point candidates detected from the second intermediate image, the singular point candidate distance calculating unit 14 forms singular point candidate pairs each by selecting the singular point candidates assumed to correspond to the same singular point on the biometric input image. Then, the singular point candidate distance calculating unit 14 calculates the singular point candidate distance representing the distance between the singular point candidates forming each pair (step S207). The singular point candidate distance calculating unit 14 passes the singular point candidate distance calculated for each pair to the quality judging unit 15 together with the number of singular point candidates unable to be paired for each type of singular point.

The quality judging unit 15 calculates the quality metric Q for the biometric input image, based on the singular point candidate distance calculated for each pair, the number of detected singular point candidates for each type of singular point, the number of singular point candidates unable to be paired, and the degree of blurring of the region to which each singular point candidate belongs (step S208). The quality judging unit 15 then judges whether or not the quality metric Q is equal to or higher than the threshold value T (step S209).

If the quality metric Q is lower than the threshold value T (No in step S209), the quality judging unit 15 judges that the biometric input image is unsuitable to use for matching. The quality judging unit 15 returns the result of the judgment to the processing unit 6.

The processing unit 6 notifies the guidance processing unit 16 that the biometric input image has been judged unsuitable to use for matching. The guidance processing unit 16 that received the notification from the processing unit 6 retrieves from the storage unit 5 a guidance message indicating that the biometric input image has been judged unsuitable for use. The guidance processing unit 16 displays the guidance message on the display unit 2 (step S210).

After that, the processing unit 6 returns control to step S201, and acquires from the biometric information acquiring unit 3 a biometric input image re-generated by rereading the user's body part. After step S201, the processing unit 6 repeats the above process.

On the other hand, if the quality metric Q is equal to or higher than the threshold value T (Yes in step S209), the quality judging unit 15 judges that the biometric input image is suitable to use for matching. The quality judging unit 15 returns the result of the judgment to the processing unit 6.

Thereafter, by executing the process from steps S109 to S112 illustrated in FIG. 6, the processing unit 6 carries out the user biometric authentication process using the biometric input image. In step S109, the matching unit 17 may use, instead of the biometric input image, the first intermediate image with blurred regions interpolated.

The order of the process from steps S202 to S204 and the process of step S205 may be interchanged, or the process from steps S202 to S204 and the process of step S205 may be executed concurrently.

As has been described above, the biometric information processing apparatus according to the second embodiment selects one of the two kinds of intermediate images generated by applying different kinds of image processing to the biometric input image, and uses the degree of local blurring of the selected intermediate image as a metric for evaluating the quality of the biometric input image. Since the quality of the biometric input image can be evaluated with higher accuracy, the biometric information processing apparatus can determine more accurately whether the biometric input image needs to be reacquired or not. Furthermore, since the biometric information processing apparatus can interpolate any blurred region from the clear regions in the neighborhood of the blurred region and can use the interpolated image for matching, the authentication accuracy can be enhanced.

As a modified example of the second embodiment, the biometric information processing apparatus may not need to perform interpolation on the blurred regions extracted from the first intermediate image. In this case, the function corresponding to the blurred region interpolating unit 20 is omitted.

Next, a biometric information processing apparatus which carries out a biometric information registration process according to a third embodiment will be described. The biometric information processing apparatus according to the third embodiment generates a registered biometric image representing the registered biometric information of each registered user and, from the registered biometric image, creates data concerning the registered biometric information to be used for matching.

The biometric information processing apparatus according to the third embodiment is substantially the same as the biometric information processing apparatus according to the second embodiment, except for differences in some of the functions of the processing unit. Therefore, the functions of the processing unit in the biometric information processing apparatus according to the third embodiment will be described below by focusing on the differences from the functions of the processing unit in the biometric information processing apparatus according to the second embodiment.

Figure 9:
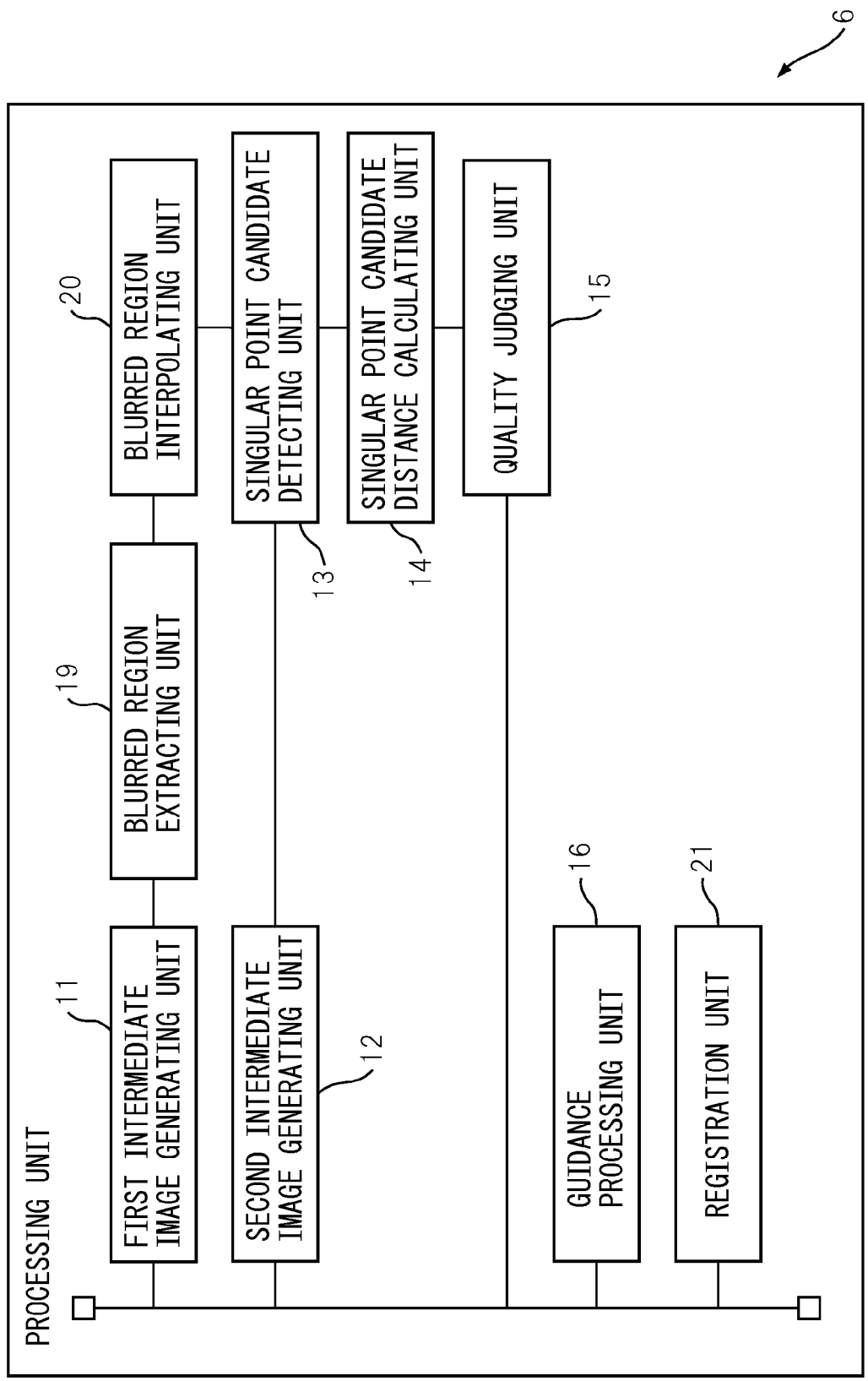
FIG. 9 is a functional block diagram of a processing unit incorporated in a biometric information processing apparatus according to a third embodiment, illustrating the functions to be implemented when registering a user's biometric information.

FIG. 9 is a functional block diagram of the processing unit incorporated in the biometric information processing apparatus according to the third embodiment. As illustrated in FIG. 9, the processing unit 6 includes a first intermediate image generating unit 11, a second intermediate image generating unit 12, a singular point candidate detecting unit 13, a singular point candidate distance calculating unit 14, a quality judging unit 15, a guidance processing unit 16, a blurred region extracting unit 19, a blurred region interpolating unit 20, and a registration unit 21. In FIG. 9, the functional blocks of the processing unit 6 corresponding to those of the processing unit 6 illustrated in FIG. 7 are respectively designated by the same reference numerals.

The registration unit 21 receives from the processing unit 6 the biometric input image that has been judged by the quality judging unit 15 as being suitable to use for matching. Then, the registration unit 21 takes the biometric input image judged suitable to use for matching as the registered biometric image and the biometric information represented by that registered biometric image as the registered biometric information.

Figure 10:
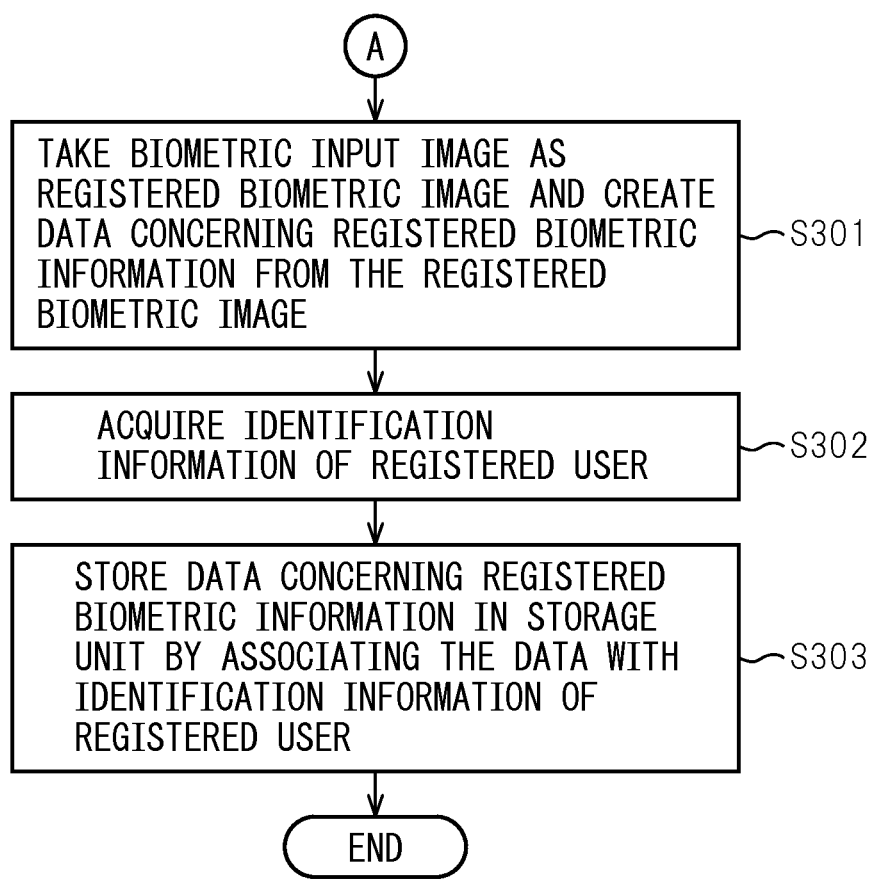
FIG. 10 is an operation flowchart of a biometric input information registration process which is performed under the control of a computer program executed on the processing unit.

FIG. 10 is an operation flowchart of the biometric input information registration process which is performed under the control of a computer program executed on the processing unit 6. This process is executed after the quality judging unit 15 has judged in step S210 in the quality judging process of FIG. 8 that the biometric input image is suitable to use for matching.

The registration unit 18 creates, from the registered biometric image, the data concerning the registered biometric information to be used for matching (step S301). The data concerning the registered biometric information may be, for example, the registered biometric image itself. Alternatively, the data concerning the registered biometric information may be a feature quantity extracted for matching purposes from the registered biometric image itself or from a sub-region thereof. When the data concerning the registered biometric information is the feature quantity to be used for matching, the registration unit 21 extracts the feature quantity for matching purposes from the registered biometric image itself or from a sub-region thereof, for example, in the same manner as the matching unit 17 in the biometric information processing apparatus 1 according to the first embodiment.

The registration unit 21 acquires the identification information of the registered user via the input unit 4 (step S302). The identification information of the registered user may be acquired before or at the time of acquisition of the biometric input image. The registration unit 21 stores the data concerning the registered biometric information in the storage unit 5 by associating the data with the identification information of the registered user (step S303).

As has been described above, when registering the biometric information of the registered user, the biometric information processing apparatus according to the third embodiment can acquire the biometric information suitable to use for matching, while preventing unnecessary reacquisition of the biometric information and thus preventing the processing time from increasing.

As a modified example of the biometric information processing apparatus according to any one of the above embodiments, the processing unit of the biometric information processing apparatus may generate three or more intermediate images by applying different kinds of image processing to the biometric input image.

Figure 11:
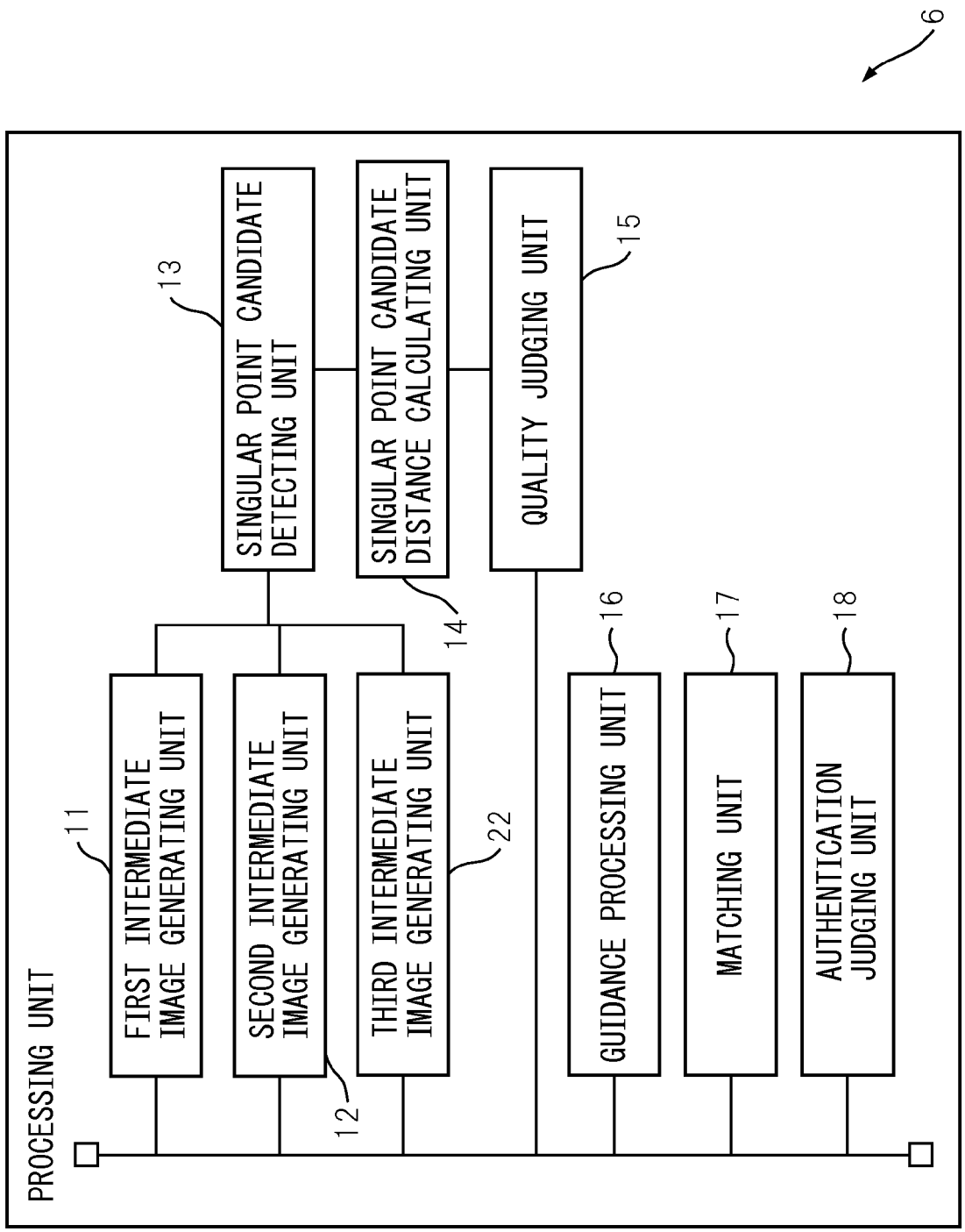
FIG. 11 is a functional block diagram of a processing unit having the function of generating three intermediate images.

FIG. 11 is a functional block diagram of a processing unit having the function of generating three intermediate images. As illustrated in FIG. 11, the processing unit 6 includes a first intermediate image generating unit 11, a second intermediate image generating unit 12, a third intermediate image generating unit 22, a singular point candidate detecting unit 13, a singular point candidate distance calculating unit 14, a quality judging unit 15, a guidance processing unit 16, a matching unit 17, an authentication judging unit 18, a blurred region extracting unit 19, and a blurred region interpolating unit 20.

In FIG. 11, the functional blocks of the processing unit 6 corresponding to those of the processing unit 6 illustrated in FIG. 2 are respectively designated by the same reference numerals. The following description deals only with differences from the functions of the processing unit in the biometric information processing apparatus according to the first embodiment.

The third intermediate image generating unit 22 generates an intermediate image which is different from the first and second intermediate images. For example, when the second intermediate image is generated by applying noise elimination processing to the biometric input image, the third intermediate image generating unit 22 may take the biometric input image itself as the third intermediate image. Alternatively, the third intermediate image generating unit 22 may generate the third intermediate image by applying a different kind of noise elimination processing to the biometric input image than the noise elimination processing used to generate the second intermediate image. On the other hand, when the first intermediate image is generated by correcting the contrast of the biometric input image, the third intermediate image generating unit 22 may generate the third intermediate image by applying frequency enhancement to the biometric input image.

The singular point candidate detecting unit 13 detects singular point candidates from the respective intermediate images. Then, the singular point candidate distance calculating unit 14 calculates singular point candidate distances as the distances between the respective singular point candidates detected from the respective intermediate images as corresponding to the same singular point. The singular point candidate distance calculating unit 14 calculates a plurality of singular point candidate distances for each designated singular point, and takes its average, median, or maximum value as representing the singular point candidate distance for that designated singular point. Since the biometric information processing apparatus can thus statistically evaluate the singular point candidate distance based on the difference in image processing, the quality metric calculated based on the singular point candidate distance can be prevented from varying due to the difference in image processing. As a result, the biometric information processing apparatus can evaluate the quality of the biometric input image in a stable manner.

As a modified example of the biometric information processing apparatus according to the second or third embodiment, the processing unit may evaluate the quality of the biometric input image, based on the degree of blurring of the region to which the singular point candidate detected from the first intermediate image belongs. In this case, the quality judging unit in the processing unit calculates the quality metric Q in such a manner at to set the quality metric Q higher as the degree of blurring of the region to which the singular point belongs decreases. For example, the quality judging unit may calculate the quality metric Q in accordance with the following equation.

$$Q = \frac{A}{N_1} \times \left( \sum_{i=0}^{N_1-1} (1 - AL_i) \right) \quad (10)$$

where $N_1$ represents the number of singular point candidates detected from the first intermediate image. $AL_i$ indicates the degree of blurring of the region that contains a given singular point candidate i ($i=0, 1, \ldots, N-1$). If the region to which the singular point belongs is a clear region, and the degree of blurring is not obtained for that region, the quality judging unit determines the degree of blurring of that region as being 0. Further, A is a coefficient that is determined in accordance with the number of singular point candidates believed to be erroneously detected. The coefficient A is determined, for example, by multiplying by 0.1 the total number $N_e$ of singular point candidates that exceeded a reference number for each type of singular point, subtracting the resulting product from 1, and multiplying the resulting value ($1-0.1 \times N_e$) by a reference value $A_0$ (for example, 1). If the total number $N_e$ of singular point candidates that exceeded the reference number is 0, the quality judging unit 15 takes the reference value $A_0$ itself as the coefficient A.

In this case, the functions corresponding to the second intermediate image generating unit and the singular point candidate distance calculating unit are omitted from the processing unit.

The present invention is not limited to the above specific embodiments. For example, in an alternative embodiment, the processing unit of the biometric information processing apparatus may include the function corresponding to the registration unit depicted in FIG. 9 in addition to the functions depicted in FIG. 2 or 7. Then, the biometric information processing apparatus can preregister the biometric information to be used for matching and can perform the biometric authentication by using the preregistered biometric information. In this case, the threshold value T that the quality judging unit in the processing unit uses to judge the quality metric Q of the biometric input image at the time of registration may be set to a different value than the threshold value T it uses at the time of matching. For example, the threshold value $T_r$ to be used at the time of registration may be set to a higher value than the threshold value $T_t$ to be used at the time of matching. The biometric information processing apparatus can then enhance the accuracy of biometric authentication by accepting only a high-quality biometric image when creating the data concerning the registered biometric information based on which the biometric authentication is to be performed. On the other hand, at the time of matching, by accepting a biometric image having a quality level sufficient to be used for matching, the biometric information processing apparatus can prevent acquisition of the biometric information from being repeated needlessly.

The biometric information processing apparatus may perform the so-called 1-to-N matching in which the registered biometric information against which the biometric input information is to be verified is not specified in advance. In this case, the matching unit in the processing unit matches the biometric input information against the registered biometric information of all the registered users stored in the storage unit. Then, from among the degrees of similarity computed with respect to all the registered biometric information, the matching unit identifies the highest degree of similarity, and obtains the identification information of the registered user corresponding to the highest degree of similarity. Then, if the highest degree of similarity is greater than an authentication judging threshold value, the authentication judging unit authenticates the user as being the registered user corresponding to that highest degree of similarity. On the other hand, if the highest degree of similarity is not greater than the authentication judging threshold value, the authentication judging unit does not authenticate the user.

The biometric information processing apparatus and the biometric information processing method disclosed in this specification are applicable to various kinds of apparatus or systems that perform biometric authentication between user biometric information and preregistered biometric information in order to permit the user to perform a desired operation. Such apparatus or systems include, for example, a computer system in which one or more terminals are connected to a server via a communication network. In this case, each terminal is equipped with a biometric information acquiring unit, and the biometric image acquired by the biometric information acquiring unit is transmitted to the server. Then, the server carries out the biometric image registration or biometric authentication process by implementing the functions of the processing unit according to any one of the above embodiments.

Of the various functions incorporated in the processing unit according to each of the above embodiments, the processor of each terminal may implement the functions corresponding to the intermediate image generating units, the singular point candidate detecting unit, the singular point candidate distance calculating unit, the quality judging unit, and the guidance processing unit, and the processor of the server may implement the other functions. This serves to alleviate the processing load on the server processor.

Further, a processing unit of a portable memory device, into which a biometric information acquiring unit, storage unit, processing unit, and a data transfer interface conforming to a standard such as Universal Serial Bus are integrated, may be configured to implement the various functions of the processing unit of the computer according to each of the above embodiments.

Further, the computer program that executes instructions for causing the computer to implement the functions of the processing unit according to each of the above embodiments may be provided in the form of a recording medium.

All of the examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A biometric information processing apparatus comprising:
    a biometric information acquiring unit which acquires a user's biometric information and generates a biometric input image representing the biometric information; and
    a processing unit which implements:
        a first intermediate image generating function which generates a first intermediate image by applying first image processing to the biometric input image;
        a second intermediate image generating function which generates a second intermediate image by applying second image processing to the biometric input image, the second image processing being different from the first image processing;
        a singular point candidate detecting function which detects, from each of the first and second intermediate images, a singular point candidate that is a point corresponding to a singular point characterizing biometric input information acquired as the user's biometric information represented by the biometric input image;
        a singular point candidate distance calculating function which calculates a distance between the singular point candidate detected from the first intermediate image and the singular point candidate detected from the second intermediate image for the same singular point contained in the biometric input information;
        a quality judging function which calculates a quality metric for the biometric input image that sets the quality metric higher as the distance between the singular point candidates decreases, and which judges whether or not the quality metric is higher than a predefined threshold value; and
        a guidance function which, if the quality metric is not higher than the threshold value, prompts the user to have the user's biometric information reacquired by the biometric information acquiring unit.

2. The biometric information processing apparatus according to claim 1, wherein the first image processing is contrast correction or frequency enhancement, and the second image processing is noise elimination.

3. The biometric information processing apparatus according to claim 1, wherein the processing unit further implements a blurred region extracting function which divides the first intermediate image into a plurality of sub-regions and which calculates the degree of blurring for each sub-region, and wherein
    the quality judging function sets the quality metric lower as the degree of blurring of the sub-region to which the singular point candidate detected from the first intermediate image belongs increases.

4. The biometric information processing apparatus according to claim 3, wherein the singular point candidate detecting function detects the singular point candidate from each sub-region by excluding any sub-region whose degree of blurring is equal to or greater than a predefined threshold value.

5. The biometric information processing apparatus according to claim 1, wherein the quality judging function sets the quality metric lower as the singular point candidates unable to be associated as the singular point candidates corresponding to the same singular point increase in number among the singular point candidates detected from the first and second intermediate images, respectively.

6. The biometric information processing apparatus according to claim 1, wherein the quality judging function sets the quality metric lower as the number of singular point candidates detected for a particular type of singular point from the first intermediate image or the number of singular point candidates detected for the particular type of singular point from the second intermediate image, whichever is larger, becomes larger than a maximum number of singular points of the particular type that can exist on the biometric input information.

7. The biometric information processing apparatus according to claim 1, wherein the processing unit further implements a third intermediate image generating function which generates a third intermediate image which is different from the first and second intermediate images, and wherein
    the singular point candidate detecting function detects a singular point candidate from the third intermediate image, and
    the singular point candidate distance calculating function determines the singular point candidate distance by taking a statistically representative value among the distances calculated between the singular point candidate detected from the first intermediate image, the singular point candidate detected from the second intermediate image, and the singular point candidate detected from the third intermediate image, respectively, as corresponding to the same singular point contained in the biometric input information.

8. The biometric information processing apparatus according to claim 1, further comprising:
an input unit which acquires user identification information; and
a storage unit which stores data concerning registered biometric information for at least one preregistered user together with the identification information of the preregistered user, and wherein
the processing unit further implements:
a matching processing function which, if the quality metric is higher than the threshold value, retrieves the data concerning the registered biometric information corresponding to the user identification information from the storage unit, and which compares the biometric input information with the registered biometric information represented by the retrieved data.

9. The biometric information processing apparatus according to claim 1, further comprising:
an input unit which acquires user identification information; and
a storage unit, and wherein
the processing unit further implements:
a registration function which, if the quality metric is higher than the threshold value, creates from the biometric input image the data concerning the registered biometric information to be used for matching, and which writes the data concerning the registered biometric information into the storage unit together with the user identification information.

10. A biometric information processing method comprising:
acquiring a user's biometric information and generating a biometric input image representing the biometric information;
generating a first intermediate image by applying first image processing to the biometric input image;
generating a second intermediate image by applying second image processing to the biometric input image, the second image processing being different from the first image processing;
detecting, from each of the first and second intermediate images, a singular point candidate that is a point corresponding to a singular point characterizing biometric input information acquired as the user's biometric information represented by the biometric input image;
calculating a distance between the singular point candidate detected from the first intermediate image and the singular point candidate detected from the second intermediate image for the same singular point contained in the biometric input information;
calculating a quality metric for the biometric input image that sets the quality metric higher as the distance between the singular point candidates decreases, and judging whether or not the quality metric is higher than a predefined threshold value; and
if the quality metric is not higher than the threshold value, then prompting the user to have the user's biometric information reacquired by a biometric information acquiring unit.

11. A non-transitory computer readable recording medium having a biometric information processing computer program for causing a computer to implement:
generating a first intermediate image by applying first image processing to a biometric input image generated by a biometric information acquiring unit as an image representing a user's biometric information;
generating a second intermediate image by applying second image processing to the biometric input image, the second image processing being different from the first image processing;
detecting, from each of the first and second intermediate images, a singular point candidate that is a point corresponding to a singular point characterizing biometric input information acquired as the user's biometric information represented by the biometric input image;
calculating a distance between the singular point candidate detected from the first intermediate image and the singular point candidate detected from the second intermediate image for the same singular point contained in the biometric input information;
calculating a quality metric for the biometric input image that sets the quality metric higher as the distance between the singular point candidates decreases, and judging whether or not the quality metric is higher than a predefined threshold value; and
if the quality metric is not higher than the threshold value, then prompting the user to have the user's biometric information reacquired by the biometric information acquiring unit.

* * * * *